United States Patent [19]
Ichikawa et al.

[11] Patent Number: 6,078,371
[45] Date of Patent: Jun. 20, 2000

[54] LIQUID CRYSTAL DEVICE AND LIQUID CRYSTAL DISPLAY APPARATUS

[75] Inventors: Takeshi Ichikawa, Hachiohji; Katsumi Kurematsu, Hiratsuka; Osamu Koyama, Hachiohji, all of Japan

[73] Assignee: Canon Kabushiki Kaisha, Tokyo, Japan

[21] Appl. No.: 09/407,299

[22] Filed: Sep. 29, 1999

[30] Foreign Application Priority Data

Oct. 5, 1998 [JP] Japan ................................. 10-282597

[51] Int. Cl.[7] .................................................. G02F 1/1335
[52] U.S. Cl. ................................................. 349/95; 349/97
[58] Field of Search .............................. 349/95, 97, 5, 349/143, 139

[56] References Cited

U.S. PATENT DOCUMENTS

| | | | |
|---|---|---|---|
| 5,161,042 | 11/1992 | Hamada | 359/41 |
| 5,608,551 | 3/1997 | Biles et al. | 359/95 |
| 5,633,737 | 5/1997 | Tanaka et al. | 349/95 |
| 5,715,022 | 2/1998 | Takamatsu et al. | 348/759 |
| 5,748,275 | 5/1998 | Sato et al. | 349/143 |
| 5,854,665 | 12/1998 | Iba | 349/119 |
| 5,946,065 | 8/1999 | Tagusa et al. | 349/138 |
| 5,969,832 | 10/1999 | Nakanishi et al. | 359/15 |

*Primary Examiner*—Kenneth Parker
*Assistant Examiner*—Mike Qi
*Attorney, Agent, or Firm*—Fitzpatrick, Cella, Harper & Scinto

[57] ABSTRACT

A microlens-equipped liquid crystal device capable of ensuring a high picture quality can be provided by obviating an adverse effect of a disclination of the liquid crystal at each pixel. Each microlens is disposed to form an optical axis deviated from the center of an associated pixel so as to form a condensed light spot substantially free from overlapping with a disclination (alignment disorder region) occurring along at least one side of a rectangular pixel. Preferably, the pixels are arranged to form a plurality of pixel units each including three primary color pixels of R, G and B, so that two of the three primary color pixels are arranged alternately in a vertical direction, and different two of the three primary color pixels are arranged alternately in a horizontal direction, and a plurality of microlenses are arranged two-dimensionally at a pitch of two pixels so that three light fluxes having passed through three primary color pixels forming one pixel until are emitted through an identical one microlens.

7 Claims, 19 Drawing Sheets

ARBITRARY RGB-MIXED COLOR

LIQUID CRYSTAL DEVICE AND LIQUID CRYSTAL DISPLAY APPARATUS

FIELD OF THE INVENTION AND RELATED ART

The present invention relates to a liquid crystal device equipped with microlenses and a liquid crystal display apparatus, particularly a full-color liquid crystal display apparatus, including the liquid crystal device.

In a multi-media of nowadays, there has been an increasing demand for apparatus and devices for communication with picture data. Among these, a liquid crystal display apparatus has called public attention because of its small thickness and small power consumption and has already developed a major industry comparable to semiconductor industry. The liquid crystal display apparatus has been principally used in notebook-type personal computers having a picture area size of around 10 inches but is believed to be adopted as larger-area display apparatus not only for personal computers but also for workstations and home television sets.

The increase in picture size is accompanied with problems, such as necessity of larger-scale and expensive production apparatus and requirement for severe electrical requirements for driving such a large-area apparatus, leading to a severe increase in production cost which increases in the second to third power of the picture area.

Accordingly, in recent years, attention has been called to a projection-type liquid crystal display system, wherein a small-size liquid crystal display panel is prepared and a picture displayed thereon is optically enlarged to be displayed to a viewer. This is because the production of a small-size liquid crystal panel can take advantage of progress of production technology allowing simultaneously a smaller size, an improved performance and a cost reduction similarly as a scaling rule regarding a higher density, a higher definition, a performance improvement and a cost reduction in production of semiconductor devices.

For the above purpose and especially in case of a TFT-driven liquid crystal display panel, sufficiently small TFTs (thin film transistors) having a sufficient drive power are required, and as a current tendency, the TFTs are being shifted from those of amorphous Si to those of polycrystalline Si and further to those formed on a single-crystalline Si substrate.

Moreover, picture signals at a resolution level required according to the NTSC standard adopted in ordinary television system do not necessitate a particularly high-speed processing. For this reason, there has been proposed a liquid crystal display apparatus including an integral structure of a display region and a peripheral drive circuit wherein not only TFTs but also a peripheral drive circuit such as a shift register or a decoder are integrally formed of polycrystalline Si or a single-crystalline Si.

As an example of liquid crystal display apparatus having such a structure, a projection-type liquid crystal display apparatus is known, and in a system including the display apparatus, polarized light is incident to the liquid crystal device to provide emitted light which has been modulated according to given display picture data, thereby enlarging and projecting the emitted light image for viewing. In such liquid crystal display apparatus, it has been also proposed to include a microlens array so as to provide an increased aperture ratio of the liquid crystal device (i.e., areal percentage of opening given by pixel electrodes).

The above-mentioned organization of a liquid crystal display apparatus system is explained with reference to FIGS. 20–23, including a light source 201, a dichroic mirror 202 of red (R), a dichroic mirror 203 of green (G), a dichroic mirror 204 of blue (B), a liquid crystal device 205, a Fresnel lens 206, a projection lens 207, and a screen 208.

Parallel light emitted from the light source 201 is separated by the respective dichroic mirrors 202, 203 and 204 into respective light fluxes of R, G and B, which are then incident to the liquid crystal display 205. In the liquid crystal display 205, voltages applied to the liquid crystal at the respective pixels of R, G and B are controlled to effect luminance modulation depending on given picture data, and the emitted picture data-carrying light fluxes are passed through the Fresnel lens 206 for condensing the light fluxes and the projection lens 207 to be projected in an enlarged size onto the screen 208.

FIG. 21A shows an example of color pixel arrangement pattern of a liquid crystal device (corresponding to the device 205 in FIG. 20) equipped with microlenses, including microlenses 211, and pixel electrodes 212 corresponding to R, G and B, and each having an aperture 213. A pixel unit comprising three color pixels including three color pixel electrodes 212 each having an aperture 213 and one microlens 211 is shown in FIG. 21B which will be described later in further detail. A section taken along a line A–A' in FIG. 21A is illustrated in FIG. 22. Referring to FIG. 22, G-light separated and reflected by the dichroic mirrors is incident from an upper position of the microlens 211 vertically to the microlens 211 to be converged at a surface of a G-pixel (electrode) 212. On the other hand, R-light and B-light are respectively incident to the microlens 211 respectively with some angles and converged at the surfaces of R-pixel (electrode) and B-pixel (electrode), respectively. Each color pixel may have a TFT-structure, e.g., as shown in FIG. 23.

Each pixel shown in FIG. 23 includes a TFT-structure, formed on a glass 101, including a gate 106, a source region 150 connected to a data signal electrode, a drain region 103 accompanied with a lightly doped drain region 107, a drain electrode 108 including laminated layers 108a and 108b, and a pixel electrode 508 connected to the drain electrode 108.

Opposite the TFT-substrate 101, a counter substrate 602 (on which microlenses are arranged but are omitted from showing) is disposed, including a black matrix mask 602 for masking regions between adjacent pixels, and a transparent counter electrode 623. The two substrates 101 and 621 are surfaced with rubbed alignment films 401 and 221 so as to align a liquid crystal 611 disposed therebetween with a certain angle θ (pretilt angle). For example, in the case of a homeotropically aligned nematic liquid crystal having a negative dielectric anisotropy, the alignment films 401 and 221 are rubbed in directions of a dashed-line arrow and a solid-line arrow, respectively, shown in FIG. 21B to align the liquid crystal molecules with a pretilt angle θ in the dashed-line arrow direction with respect to a normal to the substrates. Then, on application of an electric field, the liquid crystal molecules are gradually fallen down to increase the angle of inclination from the pretilt angle toward a position parallel to the substrates, depending on the electric field intensity applied thereto. An example of liquid crystal device of this type is described in Japanese Laid-Open Patent Application (JP-A) 8-334770.

The liquid crystal at the respective pixels in the liquid crystal device is driven by voltage application from an active matrix drive circuit structure as represented by an equivalent circuit structure shown in FIG. 24 including horizontal shift registers 121 and 122; a vertical shift register 123; video signal lines 124–129, 1210 and 1211 for supplying video signals; sampling MOS transistors 1212–1221 for sampling the video signals depending on scanning pulses from the horizontal shift registers 121 and 122; data signal lines 1224–1235 for supplying video signals from the sampling MOS transistors 1212–1221 to the respective TFTs; switching MOS transistors (TFTs) 1236 each designed for applying a voltage depending on a video signal supplied thereto to a liquid crystal 1237 disposed between a pixel electrode and the counter electrode and accompanied with a supplemental capacitor 1238 formed adjacent to the pixel electrode.

Each row of TFTs 1236 are sequentially selected by a horizontal scanning signal supplied from the vertical shift register 123 via horizontal scanning drive lines 1239–1241, and the supply of video signals to the data signal lines 1224–1235 is controlled by the sampling MOS transistors 1212–1221 driven by signals via vertical scanning drive lines 1242–1245 supplied from the horizontal shift registers 121 and 122.

More specifically, as an operation of the drive circuit, inputted video signals are sampled by the sampling MOS transistors 1212–1223 based on vertical scanning control signals supplied thereto via the lines 1242–1245 from the horizontal shift registers 121 and 122 and supplied to the vertical video signal lines 1224–1235. At this time, if a horizontal scanning control signal supplied via a first horizontal scanning drive line 1239 is high, the switching MOS transistors 1236 on the first row are turned on so that the sampled video signals are supplied to the respective pixels on the first row to provide the respective pixels with corresponding potentials. The respective pixels on subsequent rows are sequentially supplied with respective potentials based on picture data prescribed therefor in synchronism with sequential selection of horizontal scanning drive lines 1240, 1241, . . . and synchronous turning-on of the sampling MOS transistors 1212–1221.

Such a microlens-equipped liquid crystal panel and a liquid crystal display apparatus including the panel is disclosed, e.g., in Japanese Laid-Open Patent Application (JP-A) 8-114780, wherein a transmission-type microlens equipped-liquid crystal panel is generally used.

An example structure thereof is shown in FIG. 25, wherein a liquid crystal layer 17 is disposed between a layer of pixel electrodes 18 and an array of microlenses 16, and respective illumination lights of primary colors R, G and B are incident to the liquid crystal panel at respectively different angles so that the respective primary color lights are caused to enter respectively different pixels or pixel electrodes 18, whereby a color filter layer is removed and an improved light utilization efficiency is realized. This type of projection display apparatus can realize a bright full-color picture projection display by a single liquid crystal panel, and a commercial product thereof is becoming gradually circulated on the market.

However, in case where a pixel size is reduced in such a microlens-equipped liquid crystal device in order to attain a higher picture quality, the intended improved picture cannot be obtained, principally due to a lowering in contrast. This is presumably caused by a liquid crystal alignment disorder in each pixel.

More specifically, in a conventional liquid crystal display device, a region of liquid crystal alignment disorder called "disclination" is liable to occur between neighboring pixel electrodes due to an electric field between the pixel electrodes. Herein, "disclination" is defined to mean a regional transmittance or reflectance disorder caused by a regional alignment disorder of liquid crystal occurring along a side of a pixel due to a lateral electric field acting between neighboring pixel electrodes. The regional liquid crystal alignment disorder is typically caused by liquid crystal molecules tilted in directions different from the pretilt direction due to each a lateral electric field. Incidentally, the above-mentioned JP-A 7-334779 proposes to effect an aligning treatment (rubbing) in a direction parallel to or perpendicular to the sides of a rectangular pixel so that the disclination occurs along only one side of a pixel.

The occurrence of such a "disclination" may not be substantially problematic in a conventional liquid crystal device of low resolution but can result in a lowering in picture quality when even smaller size pixels are required in order to comply with a demand for better picture quality including an even higher resolution, as a result of our study for producing a higher resolution liquid crystal display device.

This is explained with reference to FIG. 21B which shows a result of analytical study of ours and is an enlarged view of one pixel unit including three primary color pixels among the color pixel arrangement pattern shown in FIG. 21A.

FIG. 21B illustrates a state of occurrence of a disclination 214 in each pixel aperture region 213 in case where a pretilt is formed in a direction of 45 deg. as indicated by a dashed-line arrow in FIG. 21B as a result of rubbing in the dashed-line arrow direction on a lower substrate and in a solid-line arrow direction on an upper substrate, together with a condensed light spot 215 formed by a microlens 211. If the disclination 214 is present in overlapping with the condensed light spot 215, a lowering in contrast leading to a lowering in picture quality, is caused. In order to obviate the hindrance by the disclination 214, it is necessary to reduce the size of the condensed light spot or enlarge each pixel size to lower an effective aperture ratio (i.e., an areal ratio of the aperture 213 to the pixel electrode 212). This is contrary to the requirement of a higher resolution. On the other hand, if the reduction in condensed light spot size is performed by cutting out a portion of the light flux entering the pixel as the change of aberration or light source size is difficult due to optical constraint, the resultant picture becomes darker.

Further, in a conventional microlens-equipped liquid crystal device as (disclosed in JP-A 8-114780) explained with reference to FIG. 25, the projected display picture is composed of projected images of R, G and B color pixels 18 in an enlarged size on the screen, the mosaic arrangement thereof, e.g., as shown in FIG. 26 becomes noticeable in the projected picture, thus being liable to lower the displayed picture quality.

SUMMARY OF THE INVENTION

In view of the above-mentioned state of the background art, a principal object of the present invention is to provide a liquid crystal device capable. of obviating adverse effects of alignment disorder regions, such as disclination, to ensure a good picture quality, and also a liquid crystal display apparatus including, such a liquid crystal device.

Another object of the present invention is to provide a single-plate full-color projection-type liquid crystal display device including a pixel unit including primary color pixels of R, G and B as roughly shown in FIG. 25 yet capable of displaying mosaic-free and well color-mixed full-color projected images, and also a liquid crystal display apparatus including the liquid crystal device.

According to the present invention, there is provided a liquid crystal device, comprising a matrix electrode substrate having thereon a plurality of pixel electrodes arranged in a matrix, a counter substrate having thereon a counter electrode disposed opposite to the pixel electrodes, a liquid crystal disposed between the pixel electrodes and the counter electrode so as to form a pixel corresponding to each pixel electrode and having a center, and an array of microlenses each disposed to have an optical axis for forming a condensed light spot for illuminating the liquid crystal at each pixel, wherein each pixel is accompanied with a disclination of the liquid crystal along a side thereof, and each microlens is disposed to have an optical axis shifted from the center of an associated pixel so as to form a condensed light spot substantially free from overlapping with the disclination at the pixel.

According to another aspect of the present invention, there is provided a liquid crystal device, comprising a matrix electrode substrate having thereon a plurality of pixel electrodes arranged in a matrix, a counter substrate having thereon a counter electrode disposed opposite to the pixel electrodes, a liquid crystal disposed between the pixel electrodes and the counter electrode so as to form two-dimensionally arranged plurality of pixels each corresponding to one pixel electrode, and an array of microlenses disposed so as to illuminate the pixels, wherein each pixel corresponds to one of three primary color pixels R, G and B forming one pixel unit, and the plurality of pixels are arranged two-dimensionally in a first direction and a second direction, so that two of the three primary color pixels are arranged alternately in the first direction, and different two of the three primary color pixels are arranged alternately in the second direction, and the microlenses are arranged two-dimensionally at a pitch of two pixels in each of the first and the second directions so that three light fluxes having passed through three primary color pixels forming one pixel unit are emitted through an identical one microlens. As a result, it becomes possible to provide a high-quality projected color picture free from RGB-mosaic pattern. Especially, in case of a reflection-type device, light flux from each pixel is made substantially parallel while being passed twice through a microlens, so that it is possible to form a bright projected image on a screen even by using an inexpensive projection lens having a small numerical aperture.

These and other objects, features and advantages of the present invention will become more apparent upon a consideration of the following description of the preferred embodiments of the present invention taken in conjunction with the accompanying drawings.

Figure 1:
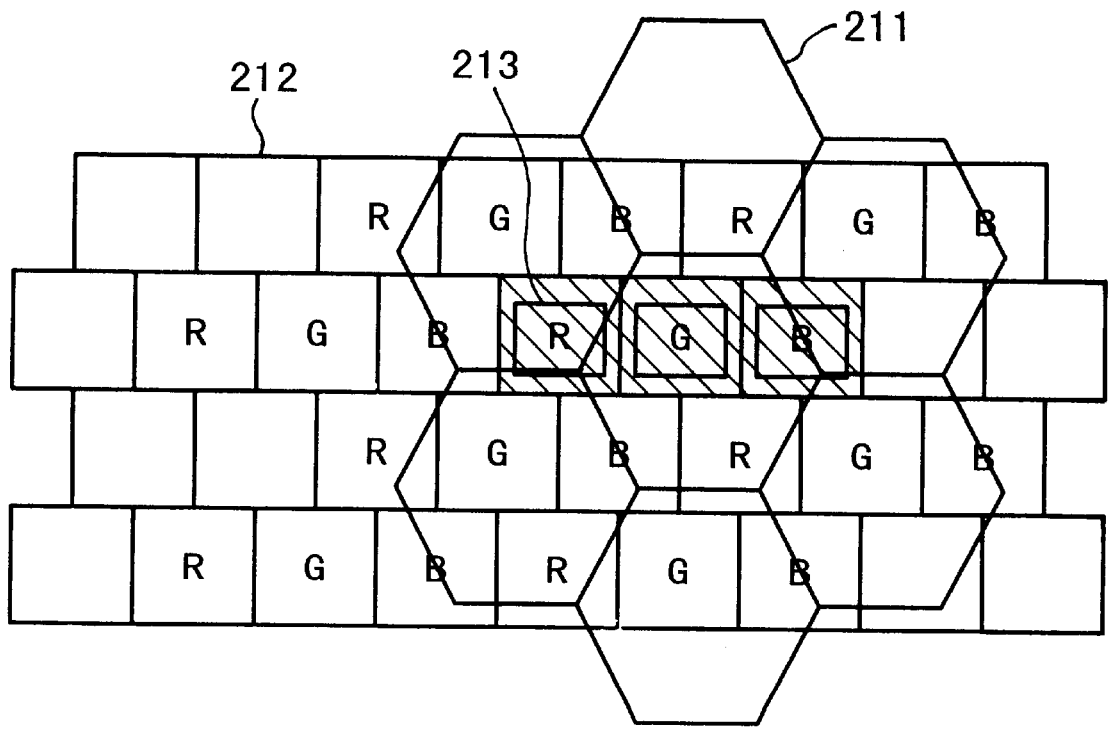
FIG. 1 is a plan view illustrating a positional relationship (or overlapping) between arranged color pixels and arranged microlenses according to an embodiment of the invention.

DESCRIPTION OF THE PREFERRED EMBODIMENTS (First Embodiment)

A preferred embodiment of the present invention will now be described with reference to FIGS. 1 and 2, which correspond to FIGS. 21A and 21B, respectively, for the prior art liquid crystal device described above. In this embodiment, the optical axis of a microlens 211 is directed not to the areal center of a pixel aperture 213 but is deviated from the center so as to provide a focal spot or condensed light spot 215 obviating an overlapping or interference with a disclination 214 as an alignment disorder region. The optical system arrangement of the liquid crystal display apparatus according to this embodiment is similar to the conventional one illustrated in FIG. 20, but includes a single plate-type microlens-equipped liquid crystal device 15 wherein the positional relationship between the pixel electrode substrate and the counter substrate carrying microlenses is set so as to form focal spots each obviating an overlapping with a disclination occurring in an associated pixel depending on a pretilt direction.

Instead of the above, it is also possible to use a microlens-equipped liquid crystal device having a conventional positional relationship between the pixel electrode substrate and the counter substrate, and optically adjust the incidence angle of light entering the microlenses 211 so as to have a focal spot 215 at each pixel deviate from the center of the pixel, thereby attaining a similar effect.

In short, the important point is to have the center of a focal spot 25 formed on the pixel electrode surface deviate from the center of an associated pixel electrode, thereby preventing the focal spot 215 from overlapping with the disclination at the pixel.

Figure 20:
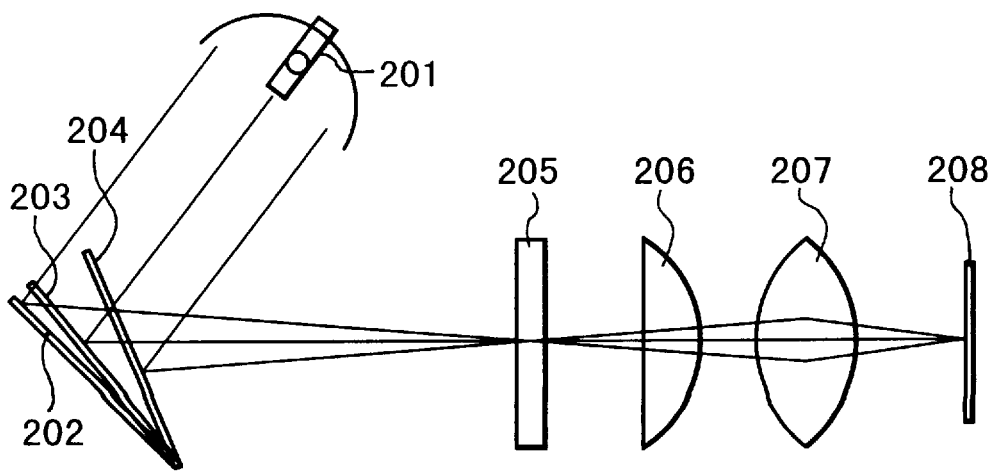
FIG. 20 illustrates an outline of a conventional liquid crystal display apparatus.

Details of the optical system suitably used for the projection-type liquid crystal display apparatus according to the present invention illustrated in FIG. 20 will now be described. The light source 201 may comprise a metal halide lamp or a halogen lamp preferably having a relatively short arc length. Light from the light source 201 is converted into parallel light by a reflector comprising a fly-eye lens so as to provide a high-efficiency condenser system in this embodiment. This is however not essential, but it is for example possible to use a system including an elliptical reflector and a rod integrator, thereby forming scrambled light allowing uniform illumination.

Then, the illuminating light is color-separated by respective dichroic mirrors 202–204 and then incident to a liquid crystal device 205 using a homeotropic alignment liquid crystal for optical modulation according to the ECB (electrically controlled birefringence) mode in this embodiment. Accordingly, the liquid crystal device 205 includes a pair of cross nicol polarizers sandwiching a liquid crystal cell (panel) to provide a normally black display wherein a dark display state is formed under no voltage application and a bright display state is formed under voltage application with an analog gradation level depending on the voltage. Then, the image light emitted from the liquid crystal device 205 is caused to pass through a Fresnel lens 206 and a projection lens 207 to be projected onto a screen 208.

Figure 23:
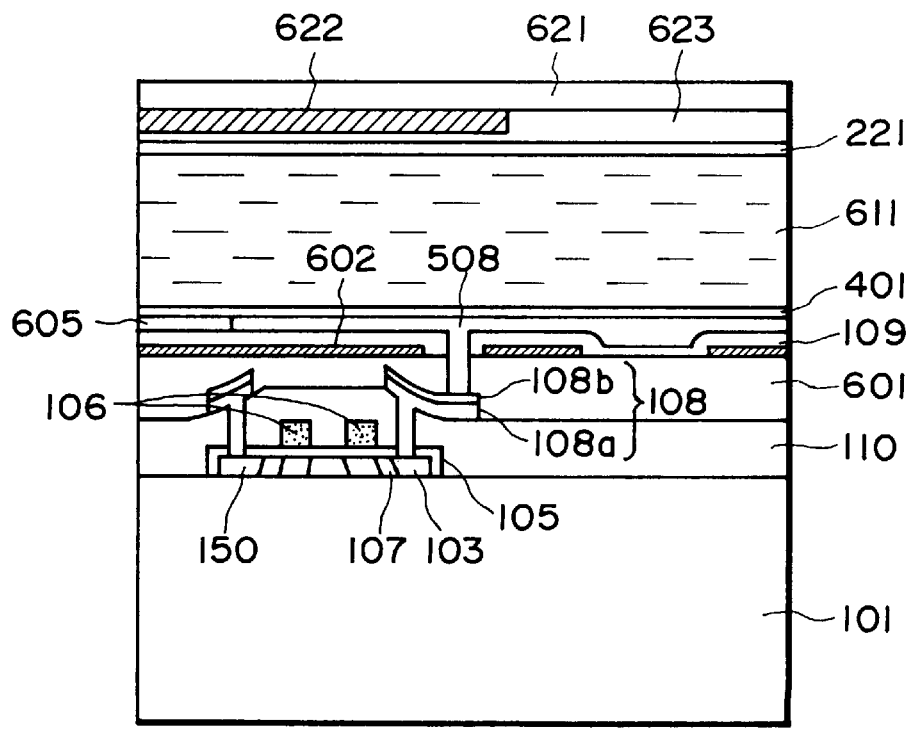
FIG. 23 illustrates an outline of circuit arrangement of an active matrix substrate of the conventional liquid crystal device.

Then, an internal structure of the liquid crystal cell (panel) constituting the liquid crystal device 205 will now be described. In this embodiment, the liquid crystal cell has an active matrix-type structure including n-type TFTs as shown in FIG. 23 similarly as the above-described prior art device. This is however not essential. It is possible to use a simple matrix-type liquid crystal cell. Further, instead of the n-type TFT substrate, it is also possible to use a p-type TFT substrate or a C-MOS substrate. It is also possible to use a semiconductor substrate provided with locally etched apertures or an SOI (silicon on insulator) substrate.

The TFT substrate may for example be formed through a process using a low-temperature poly-Si (silicon) TFT. Referring to FIG. 23, a glass substrate 101 is thermally oxidized for buffering or stress relaxation and then coated with a ca. 50 nm-thick a-Si (amorphous-silicon) layer by an ordinary low-pressure CVD (chemical vapor deposition) process using $Si_2H_6$ gas at 425° C. The a-Si layer is then poly-crystallized by irradiation with KrF excimer laser beam to form a layer providing semiconductor regions 150, 107 and 103, which are then coated with a 10–100 nm-thick gate-insulating film 105.

Then, a gate electrode 106 is formed and then the source and drain are formed by ion doping. The activation with impurities is performed in a nitrogen atmosphere at 300–400° C. for 1–3 homes. Then, a 500 nm-thick insulating film 110 of $SiO_2$ is formed and patterned to provide contact holes. Then, a metal wire layer including a lower layer 108a of TiN as a barrier metal and an upper layer 108b of Al doped with 0.5–2% of silicon, are formed. Incidentally, the other electrode materials may also be used, such as other Al alloys, W, Ta, Ti, Cu, Cr, Mo or silicides of these metals used in ordinary semiconductor or TFT production processes. The metal layer is then patterned to provide source electrodes and drain electrodes 108.

Thus, a high-performance TFT substrate can be formed in a large area at low temperatures and at a low cost. The above-described low temperature poly-Si TFT production process is preferred but is not essential. It is also possible to form a poly-Si TFT substrate by using ion injection and solid phase growth process, thereby providing a substrate integrally including a peripheral circuit. Other poly-Si TFT substrate production processes or a-Si TFT substrate production process may also be used.

After the patterning of the electrode layer, a smooth-surface intermediate insulating film 601 of $SiO_2$ is formed and smoothened by SOG (spin coating on glass substrate) process, or the plasma CVD process using TEOS (tetrathoxysilane) followed by the CMP (chemical mechanical polishing) process. Then, a non-transmissive metal film is formed, e.g., by sputtering of Ti, and then patterned to form a masking film 602. Then, a mixture gas of silane and ammonia, or a mixture gas of silane and $N_2O$, is decomposed and deposited in plasma atmosphere to form an insulating film 109 of SiN as a capacitor film. Then, the substrate is heat-treated in an atmosphere of hydrogen gas, or a mixture gas of hydrogen and an inert gas, such as $N_2$, at a temperature of 350–500° C. for 10–240 min., to hydrogenize the polysilicon.

Figure 24:
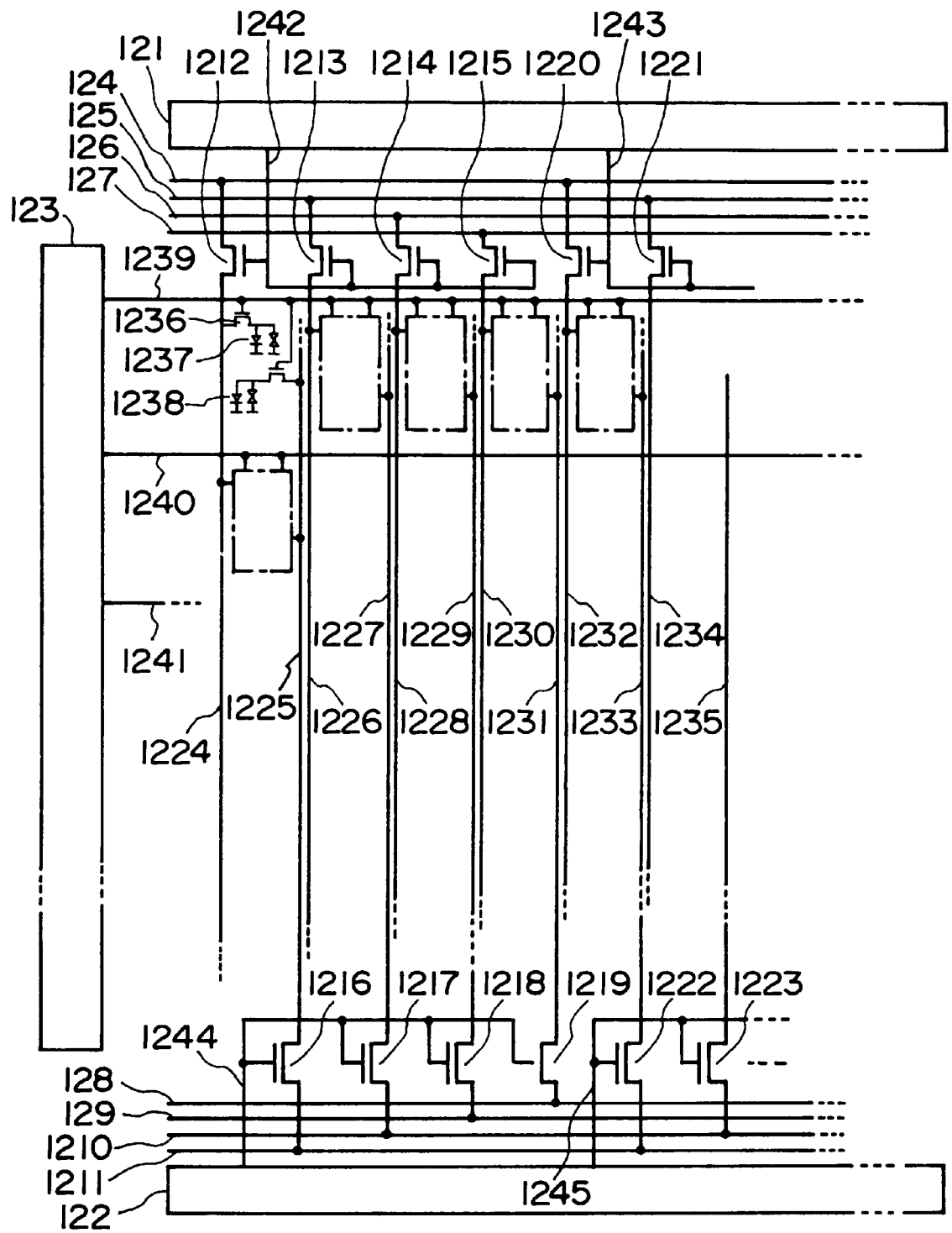
FIG. 24 illustrates a circuit arrangement on an active matrix substrate.

Then, an insulating film 605 of, e.g., SiO, is again deposited and patterned to form a through-hole, followed by formation of a transparent pixel electrode film of, e.g., ITO (indium tin oxide) in this embodiment. Then, the surface of the pixel electrode film is processed by the CMP process to provide patterned pixel electrodes 508. On the thus-formed substrate surface, a homeotropic alignment film 401 (of, e.g., "JALS 6608", available from JSR K.K.) is formed and rubbed in one direction, and a counter-substrate 621 similarly provided with a masking film 622, a counter electrode 623 and a rubbed homeotropic alignment film 221, is applied in superposition so that thin rubbed directions are anti-parallel as shown in FIG. 2 (i.e., a solid arrow direction on the counter substrate 621 and a dashed arrow direction on the lower TFT substrate), thereby forming a blank cell. The blank cell is then filled with a liquid crystal 611 having a negative (e.g., "MLC 6608", available from Merck Co.) in a thickness of, e.g., 3 $\mu$m dielectric anisotropy and then hermetically sealed. The thus-produced liquid crystal device may be driven by a drive circuit as shown in FIG. 24 already described.

Figure 2:
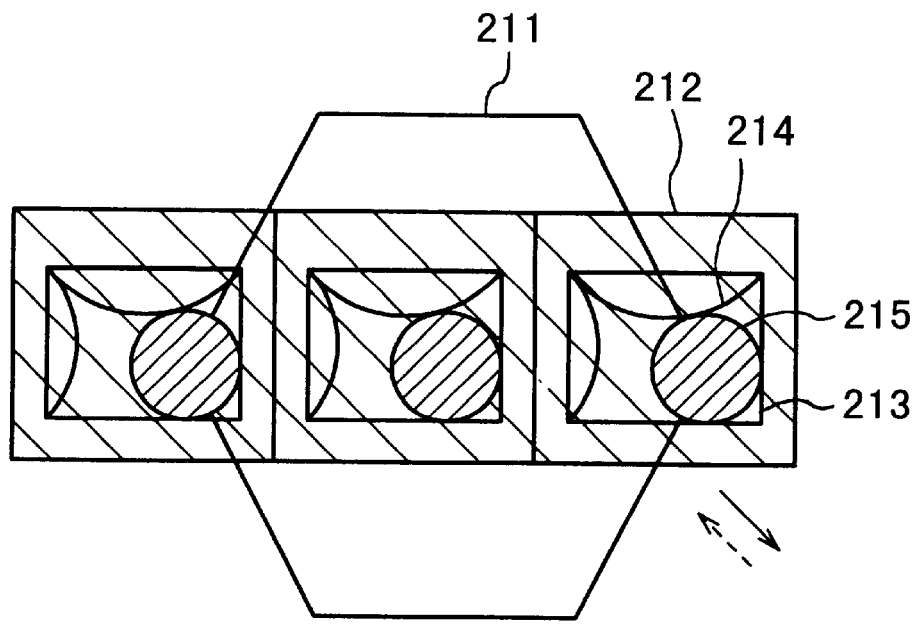
FIG. 2 is a partially enlarged view of FIG. 1.

On the counter substrate 621 of the liquid crystal device thus-prepared, an array of microlenses 211 are disposed in alignment with pixels 212 each having an aperture 213 in a manner as illustrated in FIG. 1. In a specific embodiment, each pixel has a size of 30 μm-square and an aperture 213 of 20 μm×15 μm. In this embodiment, a ca. 2 μm-wide disclination 214 is formed along an upper and a lower side, respectively, of each aperture 213 as shown in FIG. 2. In this instance, if a focal spot 215 is formed in alignment with an exact center of the aperture 213 as in the prior art device of FIG. 21B, the diameter of the focal spot 215 has to be restricted to at most 11 μm in order to obviate the overlapping of the spot 215 with the disclination 214. If the center of the focal spot 215 is designed to be deviated from the center of the pixel aperture 213, e.g., by 1 μm downward and 3.5 μm rightward, the focal spot 215 is allowed to have an enlarged spot diameter up to 13 μm without inference with the disclination 214 as shown in FIG. 2, thereby providing an improved display luminance.

In an actual optical system, it is possible to form a focal spot of 12 μm with a tolerance, whereby a projection-type liquid crystal display apparatus capable of providing a contrast of 240 increased by ca. 20% from 200 of the conventional apparatus can be realized.

Figure 3:
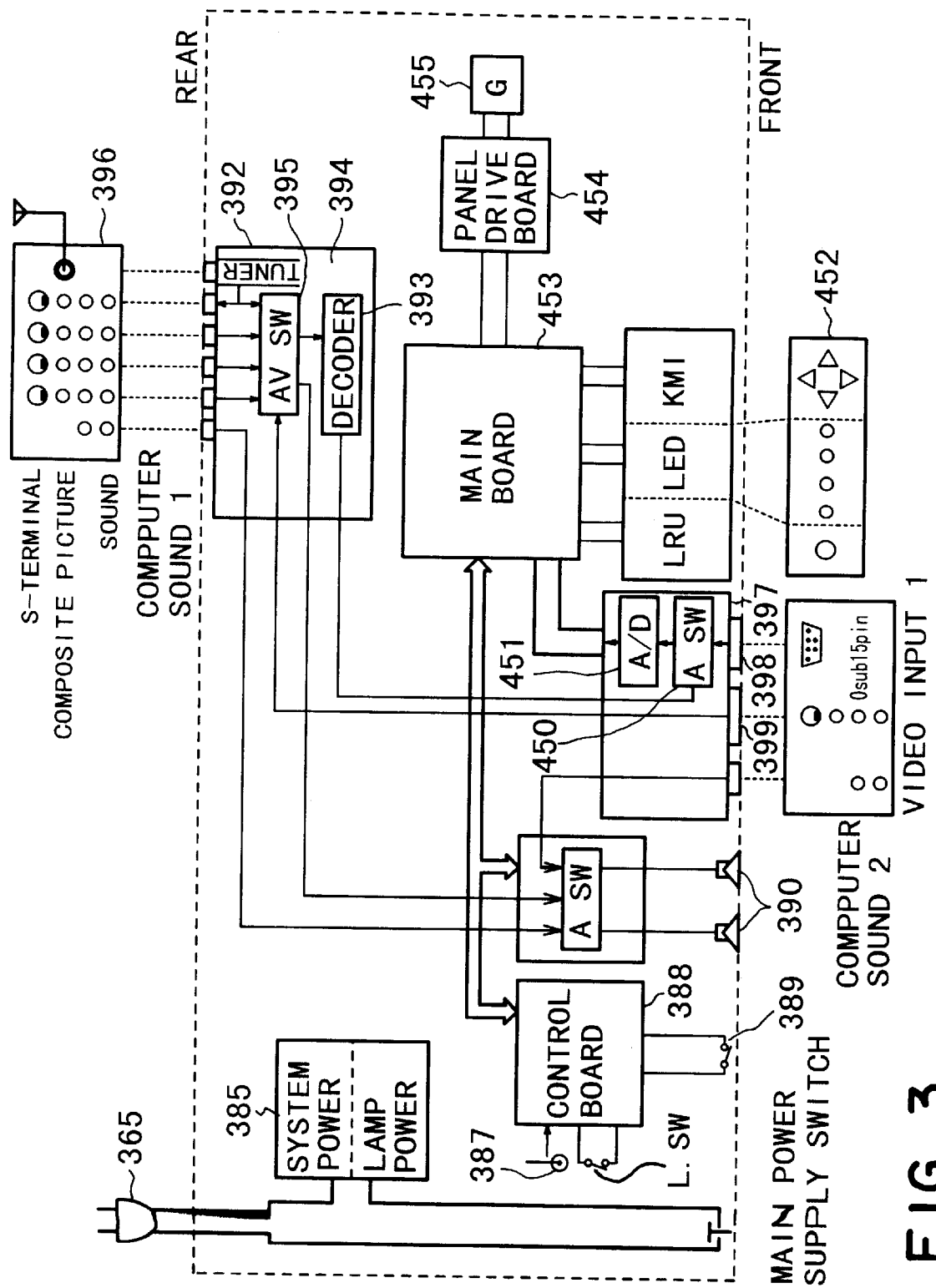
FIG. 3 is a block illustration of a peripheral electric circuit around a liquid crystal display apparatus including a liquid crystal device according to the invention.

The liquid crystal device can be driven by a peripheral electrical circuit as shown in FIG. 3. Referring to FIG. 3, the circuit includes a power supply 385 roughly divided into a lamp power supply and a system power supply for driving a panel and a signal processing circuit; a plug 386; and a lamp temperature detector 387 for detecting a lamp temperature abnormality, based on which a control board 388 effects a control, such as turning-off of the lamp by a lamp safety switch L. SW. A similar control may also be performed by a filter safety switch 389. For example, a safety measure is included, such that a high-temperature lamp house box cannot be opened even if it is tried.

The system also includes speakers 390 connected to a sound board 390 which can include processors for 3D sound or surrounded sound, as desired. A first extended function board 392 includes input terminals connected with an external device 396 having a video signal terminal S-terminal and terminals for video signal composite picture signal and sound signal, a signal selection switch 395, and a tuner 394, and is designed to send signals via a decoder 393 to a second extended function board 397. The second extended function board 397 includes a Dsub 15 pin terminal of a computer and principally functions to receive video input 1 and computer sound 2 from another channel via terminals 398 and 399, to convert these signals or video signals from the decoder 393 received via a changeover switch 450 into digital signals with an A/D converter 451.

The digital signals (NTSC signals) formed by the A/D converter 451 sent to a main board 453 principally comprising a memory, such as a video RAM, and a CPU. The digital signals received by the main board are once stored in the memory and then subjected to signal processing, such as preparation of insufficient signals for vacant pixels by interpolation required for comprising a larger number of liquid crystal pixels, γ-conversion or edge gradation, brightness adjustment, and bias adjustment. In addition to the NTSC signals, computer signals are also processed, such as a resolution conversion for a higher-resolution XGA panel on receiving VGA signals.

The main board 453 also effects further processing, such as synthesis of computer signals based on NTSC signal data for plural pictures in addition to one picture. The output from the main board 453 is subjected to serial/parallel conversion to form a signal in a form less susceptible of noise, which signal is then supplied to a panel drive head board 454. At the head board 454, the signal data is subjected to parallel/serial conversion and then D/A conversion to be divided into a number of signals corresponding to panel drive lines. The signals are supplied via a drive amplifier to drive the liquid crystal panel (G) 455.

The system also includes a remote control operation panel 452 directed to a remote controller light-receiving unit LRU, an LED display unit and a key matrix input unit KMI for adjustment of the main board, whereby a computer picture can be operated in a simple manner similarly as in television picture. In FIG. 3, only a single photo-type liquid crystal panel 455 (G) is shown, but it is also possible to operate three liquid crystal panels of R, G and B in combination based on signals from the head board 454.

The liquid crystal panel (liquid crystal device) described above includes a semiconductor substrate but can also have a structure as described hereinafter including a transparent substrate. The embodiments of the liquid crystal device herein are described to include MOS-FET or TFT drivers, but two-terminal driver devices, such as diodes can also be used. The liquid crystal panel described herein can be effectively used as a display device for a home television set, as a matter of course, a projector, a head-mount display, a 3-dimensional picture game set, a lap-top computer, an electronic notebook, a television conference system, a car navigator, and a flight panel for airplanes.

(Second Embodiment)

Figure 4A:
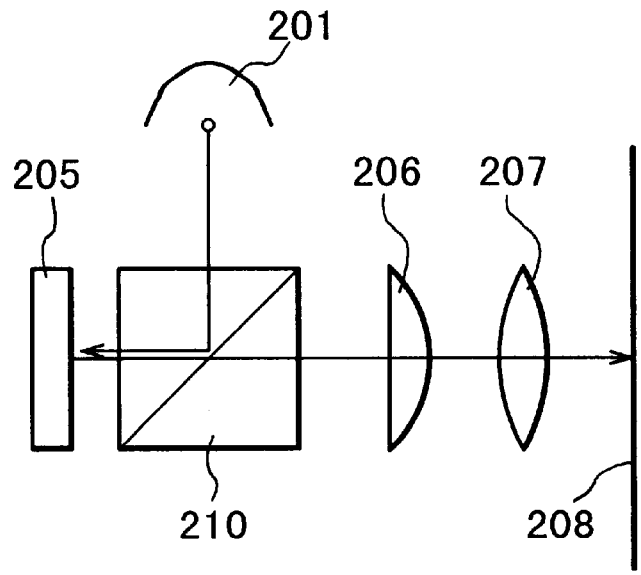
FIG. 4A is a schematic illustration of a reflection-type liquid crystal display apparatus system according to a second embodiment of the invention.

A second embodiment will now be described with reference to FIGS. 4A and 4B. The display apparatus of FIG. 4A includes a reflection-type liquid crystal device 205 including a substrate having a reflection-type pixel electrode structure. Compared with a transmission-type device, a reflection-type device is advantageous in that it allows a higher aperture rate but, on the other hand, is liable to have a larger disclination due to the influence of a lateral electric field because of a higher aperture rate and closeness of adjacent pixels. Too supplement, a higher aperture rate is allowed in a reflection-type device because it is free from a requirement of a larger margin in a transmission-type device for protecting circuit members and preventing light leakage through the circuit region. As shown in FIG. 4A, the reflection-type liquid crystal display apparatus includes a polarization beam splitter 210, to which light from a light source 201 is incident and divided into linearly polarized light components which are perpendicular to each other. Only one polarized light component is caused to enter a single reflection-type liquid crystal device 205 and optically modulated therein to be emitted therefrom and passed through the polarization beam splitter 210. The respective color lights having passed through the polarization beam splitter 210 are synthesized through a Fresnel lens 206 and projected through a projection lens 207 to form a picture in an enlarged size on a screen 208.

Figure 4B:
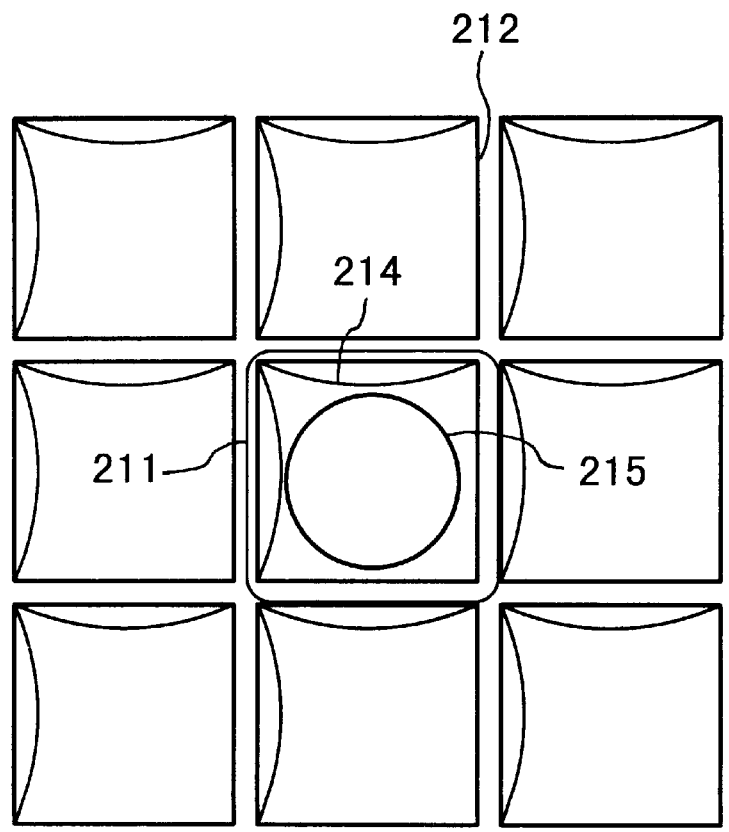
FIG. 4B is a plan view showing a positional relationship between a pixel arrangement and a microlens therein in a liquid crystal panel (liquid crystal device) contained therein.

FIG. 4B is a plan view showing a positional relationship between pixel electrodes 212 and microlenses 211 therefor (only one thereof being shown for convenience giving a focal spot 215). In this embodiment, each pixel has a size of 16 μm-square wherein a ca. 4 μm-wide disclination is developed along two sides thereof because of a lateral electrode field in case where a spacing of 1 μm is formed between adjacent pixel electrodes 212.

Figure 21A:
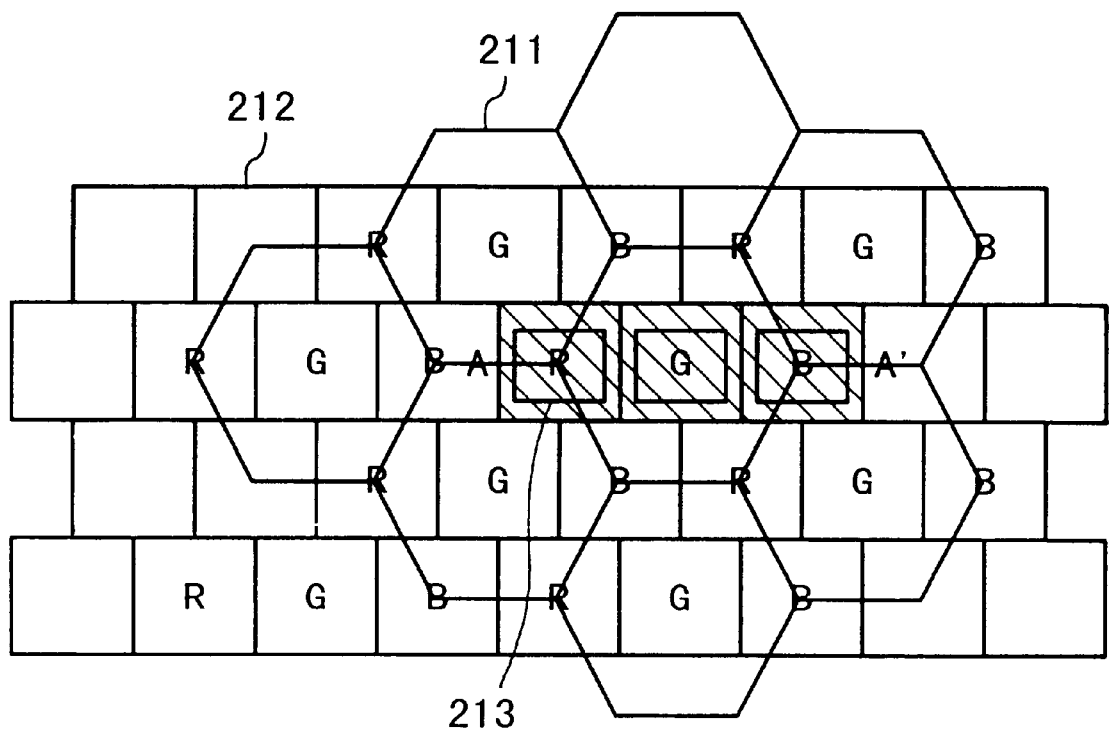
FIGS. 21A and 21B are a plan view and a partial enlarged view showing a positional relationship between arranged pixels and microlenses in a conventional liquid crystal device.
Figure 21B:
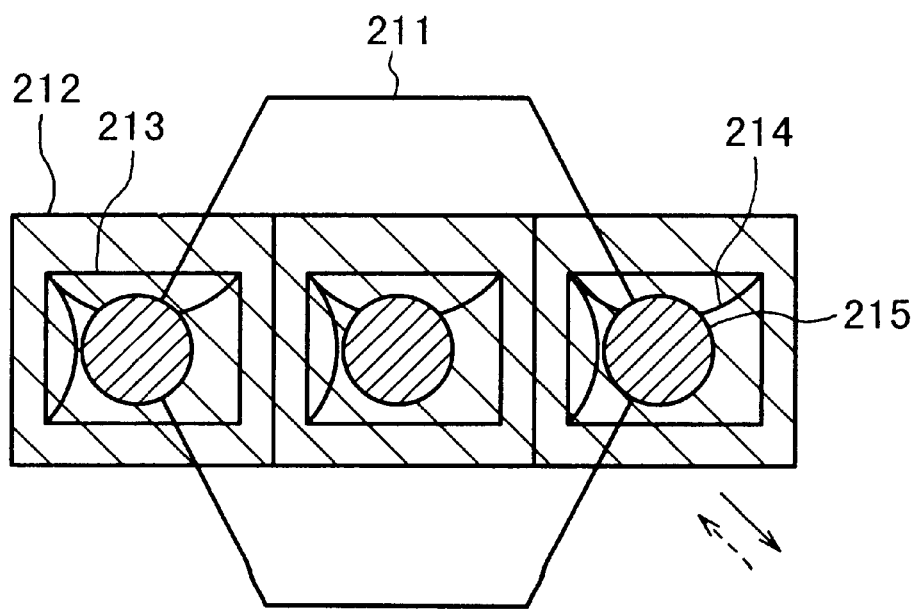
Figure 22:
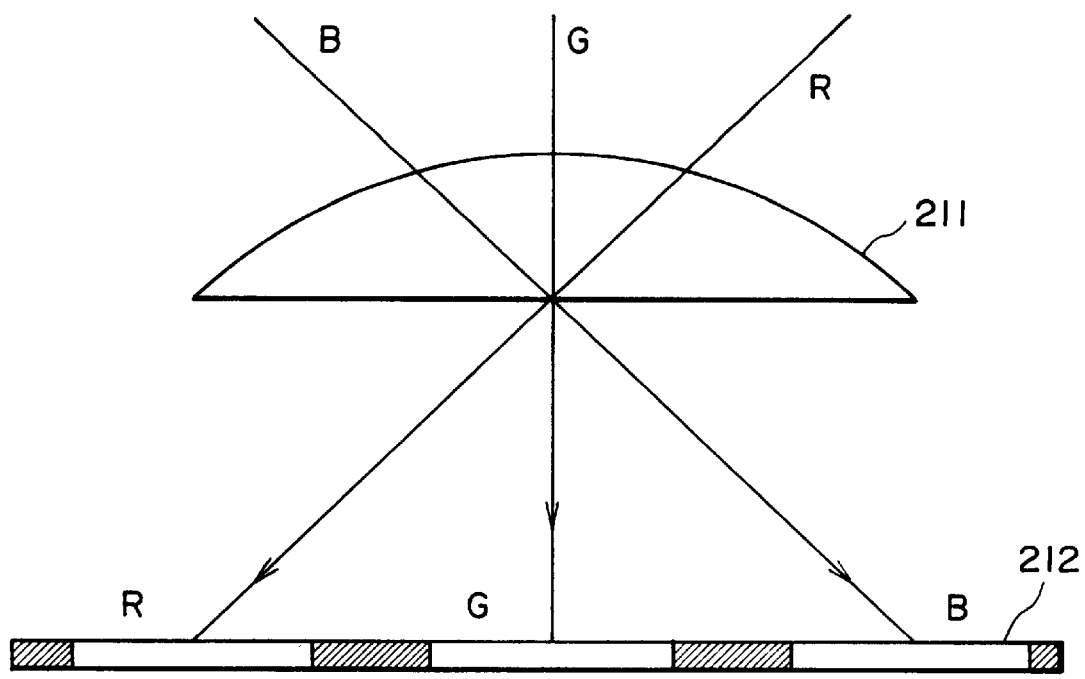
FIG. 22 is a schematic side view for illustrating states of incidence of R, G and B lights onto a pixel surface of the conventional liquid crystal device.

In a conventional system using an optical axis falling at the right outer of a pixel electrode 12, the restriction of a focal spot 215 by a microlens 211 down to 8 μm is required in order to obviate interference with the disclination 214 (as shown in FIGS. 21A and 21B). However, in this embodiment, the optical axis of each microlens is deviated from the center of the pixel electrode so as to obviate the overlapping of the resultant focal spot with the disclination, the focal spot can be enlarged up to 12 μm while obviating the interference with the disclination, thus realizing a reflection and projection-type liquid crystal display apparatus exhibiting a clear and bright picture quality.

From another viewpoint, the above embodiment allows a device of a smaller pixel size compared with a system requiring a pixel electrode size of 20 μm for providing a focal spot size of 12 μm while obviating the interference with disclination.

In the above-described first and second embodiment, a homeotropic alignment liquid crystal of the ECB mode is used. This is not limitative but similar effects can be expected by using a TN-mode liquid crystal or a scattering-type liquid crystal. This is because the "disclination" concerned herein is commonly caused as a local transmittance or reflectance disorder in a pixel due to a lateral electric field betwen adjacent pixel electrodes under voltage application for driving. The disclination is typically caused in a liquid crystal aligned with a pretilt due to an aligning treatment such as rubbing, and liquid crystals of the ECB-mode are particularly effectively used.

In the above described embodiments, rectangular pixel electrodes and thus rectangular pixels are used. However, a rectangular pixel can be deformed to source extent so as to provide a region for a driver TFT or provide a maximum aperture rate, and even a hexagonal picture can be formed for this purpose. Herein, the enter of a pixel is defined as an areal center of the pixel, and for a rectangular pixel, the center is given as an intersection of the two diagonal lines.

Further, in the above-described embodiments, a single plate-type color liquid crystal device is used. The present invention is however also applicable to a three plate-type color liquid crystal device. In such a three plate-type color liquid crystal device, the necessity of a smaller pixel size is moderated, but in color where each color panel size is further reduced, each pixel size is also reduced, and the effect of the microlens optical axis deviation according to the present invention becomes noticeable for providing a good picture quality.

Further, the term "microlens (array)" described herein means not only one made of an inorganic medium, such as glass, as used in the above and subsequent embodiments but also one made of an organic medium formed by providing a refractive index distribution therein, such as a holographic microlens (array) as disclosed in JP-A 10-300934. In this instance, the microlenses can also exhibit functions of color separation and/or polarization separation.

(Third Embodiment)

Figure 5:
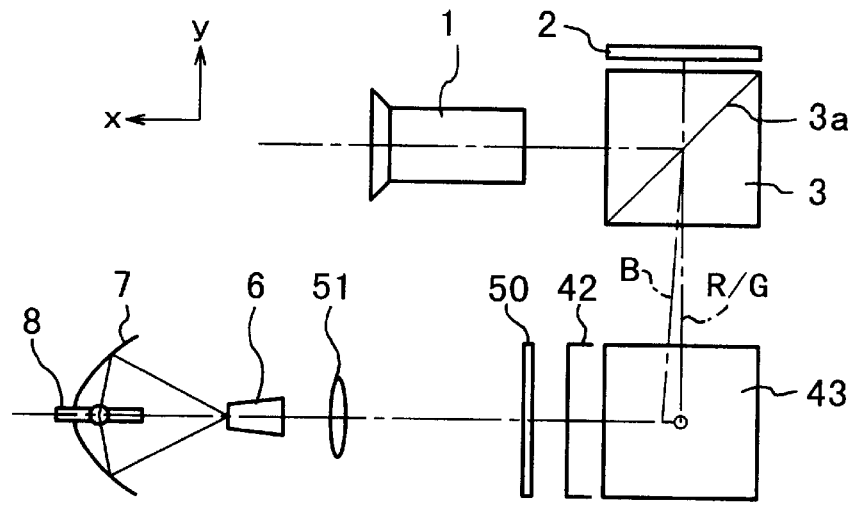
FIGS. 5–7 respectively illiterate an embodiment of projection-type liquid crystal display apparatus optical system including the liquid crystal panel of FIG. 4 on an X-Y coordinate system.
Figure 6:
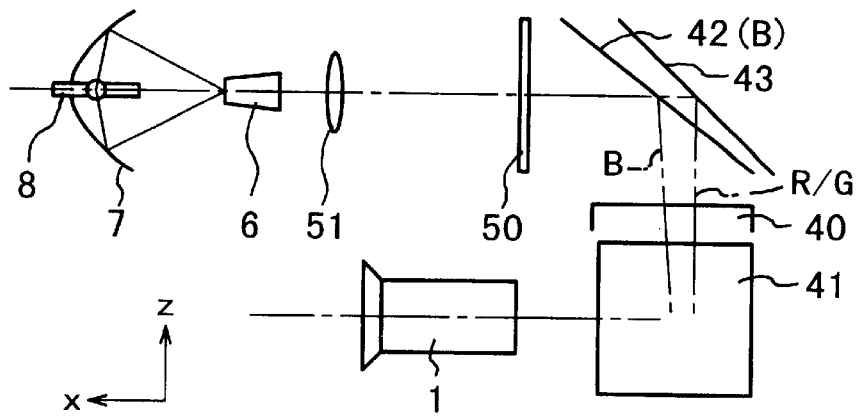
Figure 7:
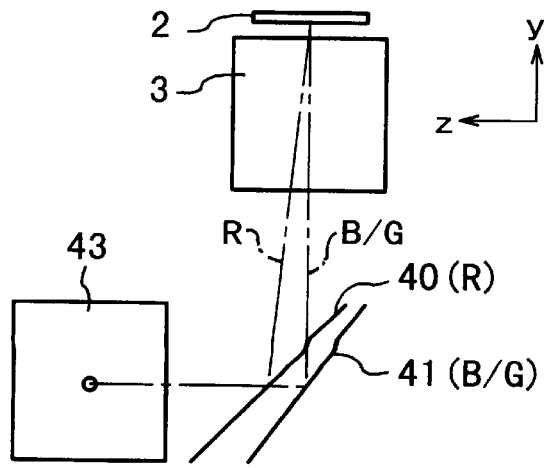
Figure 9:
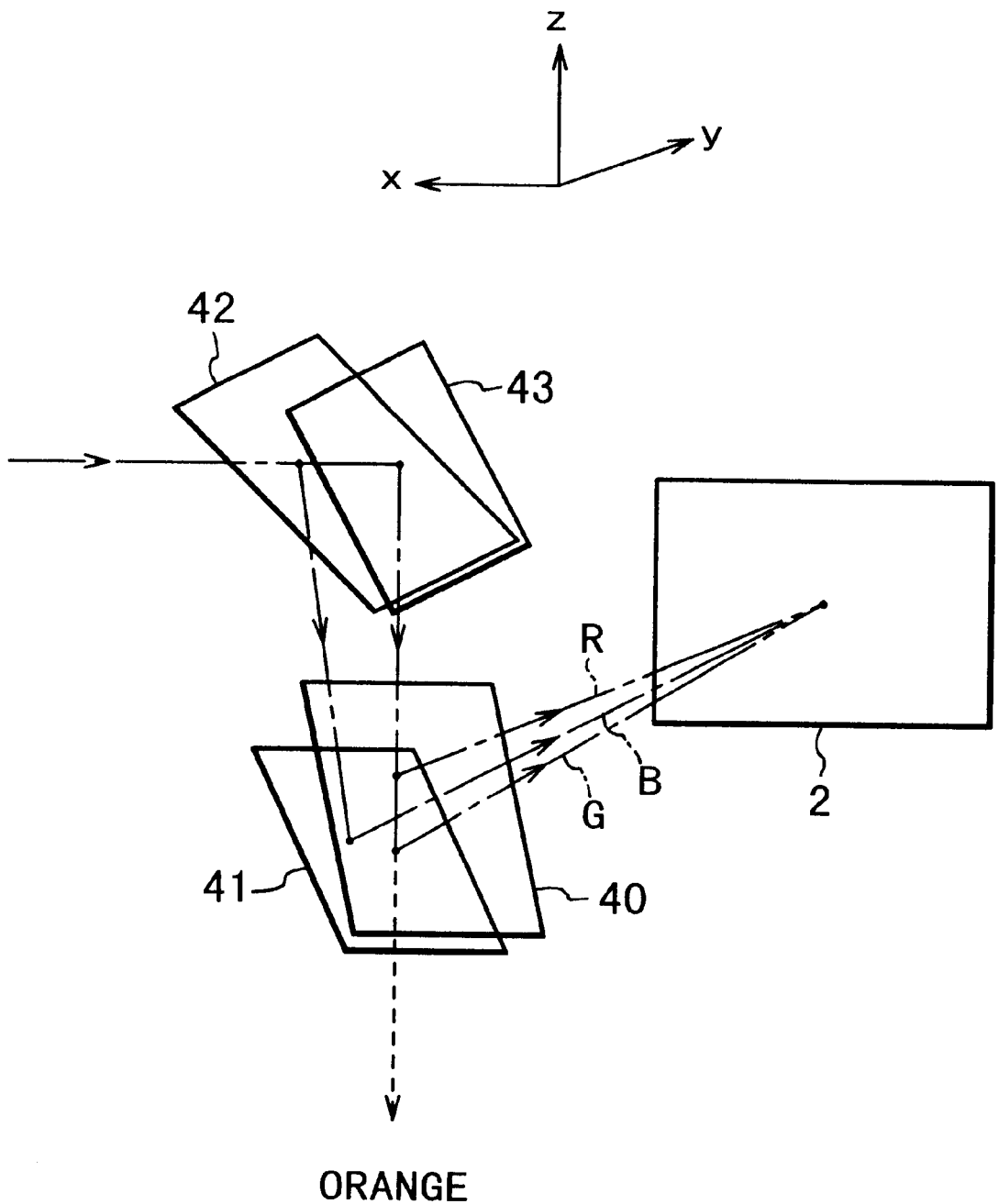
FIG. 9 illustrates a perspective organization of the above-mentioned liquid crystal display apparatus optical system on an X-Y-Z coordinate system.

FIGS. 5, 6 and 7 illustrate an optical system organization of a projection-type liquid crystal display apparatus according to the present invention as viewed on an X-Y coordinate system, an X-Z coordinate system and a Y-Z coordinate system, respectively, and FIG. 9 illustrates a perspective view of a portion of the system. Referring to these figures, the liquid crystal display apparatus system includes a projection lens 1, a microlens-equipped liquid crystal panel (liquid crystal device) 2, a polarization beam splitter (PBS) 3, an R (red)-light reflection dichroic mirror 40, a B/G (blue & green)light reflection dichroic mirror 41, a B (blue)-light reflection dichroic mirror 42, a high-reflectance mirror 43 for reflecting all light fluxes, a Fresnel lens 50, a convex lens 51, a rod-shaped integrator 6, an elliptical reflector 7, and an arc lamp 8, as a white light source, such as a metal halide lamp, or UHP (ultra-high pressure mercury lamp).

Figure 8A:
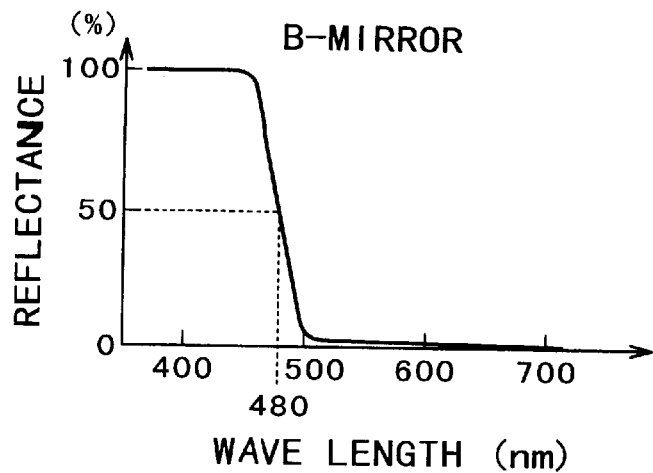
FIGS. 8A–8C show spectral reflection characteristic of B-, B/G- and R-dichroic mirrors, respectively, used in the above-mentioned liquid crystal display apparatus optical system.
Figure 8B:
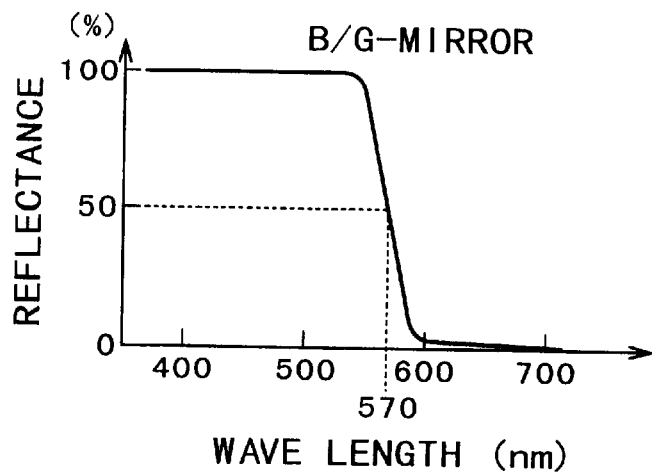
Figure 8C:
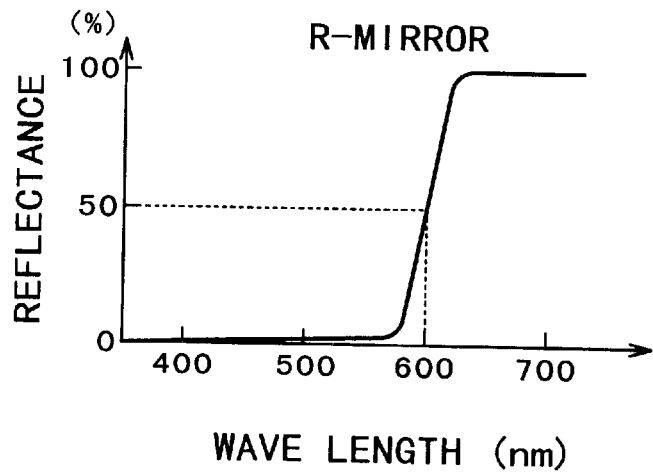

Herein, the R (red)-reflection dichroic mirror 40, the B/B (blue & green)-reflection dichroic mirror 41 and B (blue)-reflection dichroic mirror 42 have spectral reflection characteristics as shown in FIGS. 8C, 8B and 8A, respectively. These dichroic mirrors are disposed three-dimensionally together with the high-reflectance mirror 43 as shown in a perspective view of FIG. 9, whereby white illumination light is separated into three primary color lights of R, G and B, which are then cause to illuminate the liquid crystal panel 2 in three-dimensionally different directions, as will be described later.

Now, the process of light flux progress will be described. First, white light flux emitted from the light source 8 is condensed by the elliptical reflector 7 at an entrance of the integrator 6 disposed in front of the elliptical reflector 7 and caused to proceed through the longitudinal body of the integrator 6 while causing repetitive reflection within the body for uniformizing the spatial intensity distribution thereof. Then, the light flux emitted from the integrator 6 is passed through the convex lens 51 and the Fresnel lens 50 to be converted into parallel light flux in a negative (−) direction along the x-axis of FIG. 6 and reach the B-reflection dichroic mirror 42.

At the B-reflection dichroic mirror 42, only B (blue)-light fraction is reflected and directed downward in a negative direction generally along the Z-axis with a prescribed angle from the Z-axis toward the R-reflection dichroic mirror 40. On the other hand, the other color light fractions (RG lights) are passed through the B-reflection dichroic mirror 42 to reach the high-reflectance dichroic mirror 43 and are reflected thereat at a right angle downwardly in a negative (−) direction along the Z-axis also toward the R-reflection dichroic mirror 40.

Thus, the B-reflection dichroic mirror 42 and the high reflectance mirror 43 are both disposed so as to reflect the light flux incident thereto in the negative (−) direction along the x-axis into the downward direction with reference to FIG. 6. Further, the high-reflectance mirror 43 is disposed (or rotated) at an angle of just 45 deg., and the B-reflection dichroic mirror 42 is disposed at an angle slightly smaller than 45 deg., respectively, from the x-y plane with respect to the y-axis as a rotation axis.

As a result, the R/G lights are reflected by the high-reflectance mirror at a right angle downwardly in the negative direction along the Z-axis, while the B-light is reflected by the B-reflection dichroic mirror downward in a direction forming a prescribed angle (tilted in an X-Z plane) from the Z-axis. In this embodiment, so as to provide an alignment of the illumination region on the liquid crystal panel 2 with the B-light and the R/G-light, the amount of shift from the high-reflectance mirror 43 and the amount of tilt of the B-reflection dichroic mirror 42 are determined so as to have the principal rays of the respective color lights intersect with each other on the liquid crystal panel 2.

Then, the downwardly directed B-light and R/G light are directed to the R-reflection dichroic mirror 40 and the B/G-reflection dichroic mirror 41. In this embodiment, these dichroic mirrors 40 and 41 are disposed below the B-reflection dichroic mirror 42 and the high-reflectance mirror 43. Further, the B/G-reflection dichroic mirror 41 is disposed (or rotated) at an angle of 45 deg. and the R-reflection dichroic mirror 41 is disposed at an angle slightly smaller than 45 deg., respectively from the x-z plane with respect to the x-axis as a rotation axis.

Accordingly, among R/G/B light fractions, entering these dichroic mirrors, B/G lights are caused to pass through the R-reflection dichroic mirror 40 and are reflected by the B/G-reflection dichroic mirror 41 at a right angle into a positive (+) direction along the y-axis and passed through the PBS 3 to be polarized and illuminate the liquid crystal panel 2. Of these, the B-light flux has been directed in a direction tilted at a prescribed angle with respect to the Z-axis (in the X-Z plane as described with reference to FIGS. 5 and 6) and, after being reflected by the B/G-reflection dichroic mirror 41, is incident to the liquid crystal panel 2 while retaining the prescribed angle (tilted from the y-axis) as an incidence angle (tilted in the x-y plane).

The G-light is reflected perpendicularly at the B/G-reflection dichroic mirror to proceed in a positive (+) direction along the Y-axis and then polarized by the PBS 3, thereby illuminating the liquid crystal panel 2 at an incidence angle of 0 deg, i.e., perpendicular to the liquid crystal panel 2. Further, the remaining R-light is reflected by the R-reflection dichroic mirror 40 disposed before the B/G-reflection dichroic mirror 41 in a positive (+0 direction along the y-axis with a prescribed angle (tilted from the y-axis in the y-z plane) and polarized through the PBS 3 to illuminate the liquid crystal panel 2 with the prescribed tilt angle as an incidence angle from the y-axis in the y-z plane, as shown in FIG. 7.

Similarly as the high-reflectance mirror 43 and the B-reflection dichroic mirror 42, the amounts of shift from the B/G-reflection dichroic mirror 41 and tilt of the R-reflection dichroic mirror 40 are determined so as to have the principal rays of the respective color lights intersect with each other on the liquid crystal panel 2, thereby aligning the illumination regions by the respective color lights on the liquid crystal panel 2. Further, in this embodiment, as shown in FIGS. 8B and 8C, the cut wavelengths by the B/G-reflection dichroic mirror 31 and by the R-reflection dichroic mirror 40 are determined at 570 nm and 600 nm, respectively, so that an unnecessary orange light fraction is passed through the B/G-reflection dichroic mirror 41 to be discarded, thereby ensuring an optimum color balance.

Then, the respective lights of R, G and B incident to the liquid crystal panel 2 is reflected while receiving polarization modification to return to the PBS 3, from which light flux reflected in a positive (+) direction along the x-axis is emitted as a picture light and projected through the projection lens 1 onto a screen (not shown), as will be described hereinafter. Incidentally, the R, G and B lights are incident to the liquid crystal panel 2 at mutually different incident angles and therefore the R, G and B lights reflected therefrom have different emission angles, so that the projection lens 1 is designed to have a diameter and an aperture sufficient to wholly capture these color lights.

Figures 25, 26:
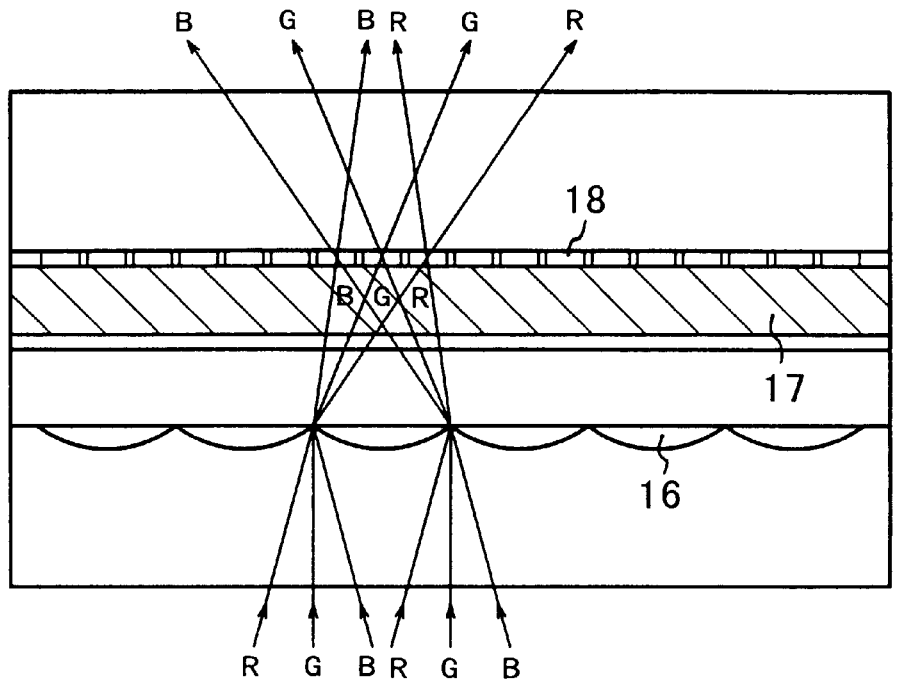
FIG. 25 is a partial enlarged sectional view of a conventional transmission-type microlens-equipped liquid crystal panel.
FIG. 26 is a schematic enlarged plan view illustrating a projected picture on a screen obtained by the liquid crystal panel of FIG. 25.

Incidentally, in the case of a reflection-type liquid crystal display apparatus of this embodiment, the inclination of color lights incident to the liquid crystal panel is rather moderated by a paralleling action due to two times of passing through the microlenses of the respective color lights. On the other hand, in a conventional transmission-type liquid crystal display apparatus as illustrated in FIG. 26, the light flux emitted from the liquid crystal panel 2 is further spread due to enhancement by the focusing action of the microlenses, so that an expensive projection lens having a large numerical aperture has been required in order to capture such spread light. In this embodiment, however, the spreading of emitted light from the liquid crystal panel 2 can be relatively suppressed, so that a projection lens having a relatively small numerical aperture can provide a sufficiently bright projection picture, thus allowing the use of an inexpensive projection lens.

Figure 10:
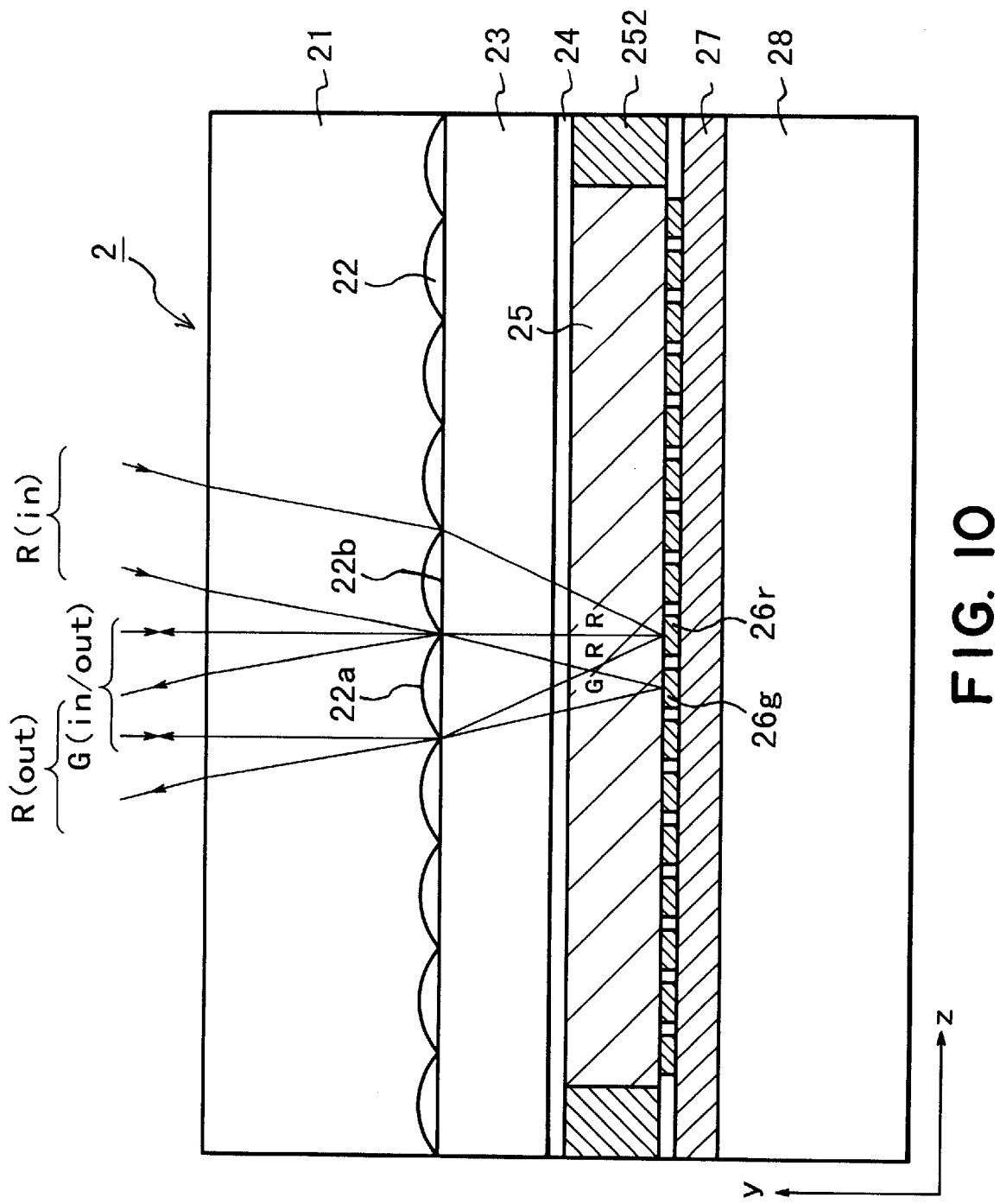
FIG. 10 is a sectional view of a liquid crystal panel (liquid crystal device) according to an embodiment of the invention.

Then, details of a liquid crystal panel 2 to be used in the present invention (as a liquid crystal panel 2 in FIG. 7 in an upside-down form) will be described with reference to FIG. 10. Referring to FIG. 10, the liquid crystal panel 2 includes a microlens substrate 21, an array of microlenses 22 disposed thereon, a lass sheet 23 forming a counter-substrate having thereon a transparent counter electrode 24, a liquid crystal layer 25, and a layer of pixel electrodes 26 and an active matrix drive circuit unit 27 formed on a silicon semiconductor substrate 28 having a detailed structure similar to those described with reference to FIG. 23.

The microlenses 22 are formed on one surface of a glass substrate 21 of alkaline glass through the so-called ion-exchange process so as to form a two-dimensional array structure at a pitch which is twice as large as that of the pixel electrodes 26. The liquid crystal layer 25 comprises a nematic liquid crystal of the ECB (electrically controlled birefringence) mode, inclusive of the DAP (deformation of aligned phases) mode using a homeotropically aligned nematic liquid crystal having a negative dielectric anisotropy, the HAN (hybrid alignment nematic) mode using a nematic liquid crystal having a positive or negative dielectric anisotropy. These liquid crystals are respectively aligned in a specific form by using an alignment film in contact therewith, which causes a pretilt of liquid crystal molecules and inevitably causes a destination along at least one side, generally two sides, of a rectangular pixel as has been discussed with reference to FIGS. 21 and 2.

The pixel electrodes 26 (inclusive of 26g, 26r, etc.) comprise Al and also function as a reflection mirror. For this purpose, the Al electrodes 26 have been subjected to the so-called CMP (chemical mechanical polishing) process after patterning thereof so as to provide a good surface characteristic exhibiting an enhanced reflectivity. The active matrix drive unit 27 is a semiconductor circuit formed on the silicon semiconductor substrate 28 and supplies drive voltages to the respective pixel electrodes 26 according to the active-matrix drive mode. At a peripheral part surrounding or neighboring the matrix circuit, a peripheral drive circuit (not shown) inclusive of gate line drivers such as a vertical shift register and data line drivers such as a horizontal shift register is disposed as described with reference to FIG. 24. These peripheral drive circuits are designed so as to write in prescribed display states at respective color pixels R, G and B based on given primary color signals of R, G and B. Each pixel electrode 26 is not provided with a color filter segment but can be discriminated as one of R, G and B pixels based on a primary color signal supplied thereto, thereby forming a prescribed arrangement of R, G and B pixels as described hereinafter.

Now, referring to FIG. 10, G-light for illuminating the liquid crystal panel 2, for example, is noted. As mentioned before, after being polarized through the PBS 3, the G-light is vertically incident to the liquid crystal panel 2. Among the G-color rays, a G-color ray incident to one microlens 22a is represented by arrows G (in/out) in FIG. 10. As shown in FIG. 10, G-light is condensed by the microlenses 22a to illuminate a G-pixel electrode 26g and reflected by the pixel electrode 26g composed of Al to be emitted out of the liquid crystal panel 2 again through the same microlens 22a.

During the reciprocal passage through the liquid crystal layer 25, the polarized G-light is optically modulated by the liquid crystal 25 driven by an electric field formed between the pixel electrode 26g and the counter-electrode 24 based on a data voltage applied to the pixel electrode 26g, and then emitted from the liquid crystal panel 2 to return to the PBS 3. Then, depending on the degree of modulation received at the liquid crystal layer 25, the G-light is reflected at a different degree at a boundary 3a of the PBS 3 toward the projection lens 1, thereby exhibiting a density gradation at the pixel 26g.

Then, R-light incident to the liquid crystal panel 2 in an oblique direction in a section (y-z plane as shown in FIG. 7) of the panel 2 is noted in FIG. 10. Also after being polarized through the PBS 3, e.g., an R-light ray denoted by arrows R(in) incident to a microlens 22b is condensed by the microlens 22b to illuminate a pixel electrode 26r which is located at a position shifted leftward from a position directly below the microlens 22b. Then, the R-light R(in) is reflected by the pixel electrode 26r and then emitted as a light ray denoted by arrows R(out) through a microlens 22a which neighbors and is shifted leftward (i.e., in a negative (−) direction along the z-axis) from the microlens 22b through which it has entered the liquid crystal panel 2. During the passage through the liquid crystal layer 25, the polarized R-light is optically modulated by the liquid crystal 25 driven under an electric field between the pixel electrode 26r and the counter-electrode 24 based on a data voltage applied to the pixel electrode 26r to be emitted out of the liquid crystal panel 2 and return to the PBS 3. Thereafter, the R-light is projected as a portion of picture light having a gradation level depending on the received optical modulation in the same manner as the above-described G-light.

Incidentally, FIG. 10 appears to illustrate a state where the G-light and the R-light above the pixel electrodes 26g and 26r appear to overlap each other, thus causing interference with each other. However, this is simply because the thickness of the liquid crystal layer 25 is schematically enlarged for easy comprehension. The actual thickness of the liquid crystal layer 25 is on the order of 5 μm which is much smaller than 50–100 μm of the sheet glass 23, so that such interference does not actually occur regardless of the pixel size.

Figure 11:
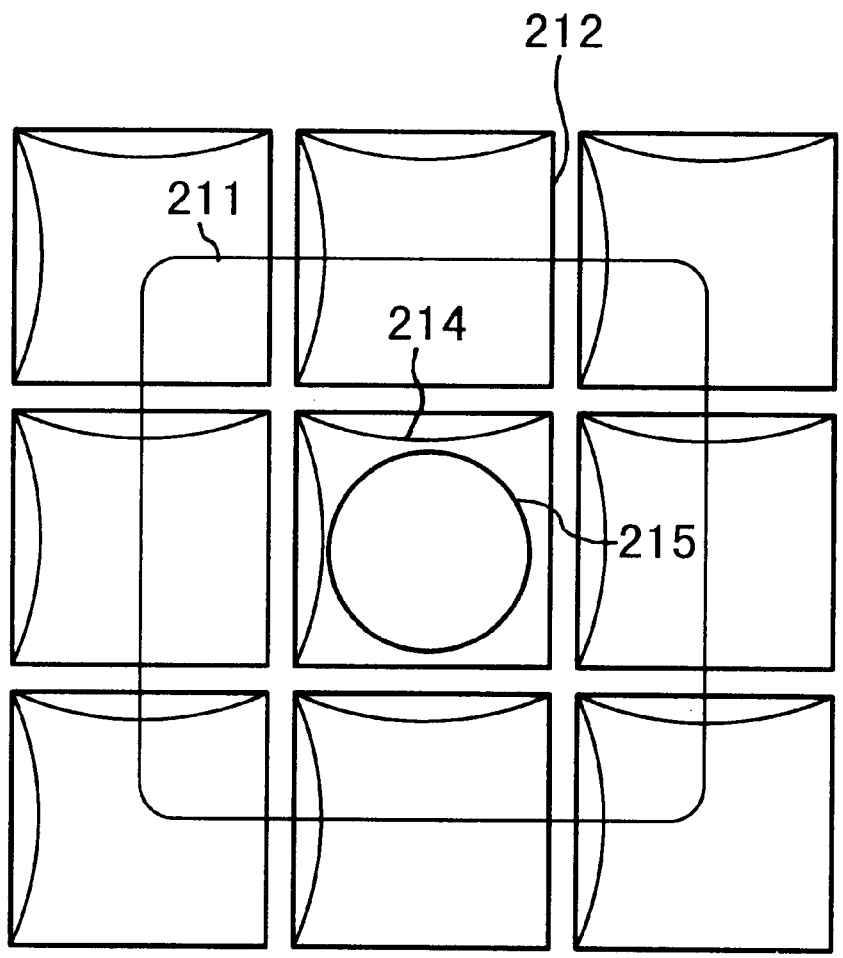
FIG. 11 is a plan view showing a positional relationship between arranged pixels and a microlens according to a third embodiment of the invention.

FIG. 11 illustrates a planar positional relationship between a microlens 211 and pixel electrodes 212 of 10 μm-square in an embodiment. Different from Second embodiment illustrated in FIG. 4B, one microlens is designed to work for all color pixels of R, G and B. Accordingly, the size of one (color) pixel has to be relatively reduced so that a disclination can occupy a larger areal proportion of a pixel electrode. Further, in case of a picture exhibiting an identical luminance over the entire area, mutually adjacent pixels of different colors are liable to be affected by a lateral electric field. Thus, in this embodiment, the lowering in image quality due to disclination is liable to occur, so that the effect of the present invention can exhibit a larger effect.

More specifically, as shown in FIG. 11, a larger focal spot is allowed by shifting the optical axis by ca. 2 μm in each of x and y directions (i.e., rightward and downward) so as to obviate the disclination. For example, in this example, a disclination in a width of 4 μm is assumed to occur, and the focal spot diameter is set to 6 μm. FIG. 11 shows a state wherein a focal spot 215 is formed so as to clearly obviate the disclination 214. However, it has been experimentally confirmed that the shift of the optical axis results in a remarkable improvement in picture quality, such as contrast, even if some overlapping at an edge of a focal spot with a disclination occurs, compared with a conventional case of no optical axis shift.

Figure 12A:
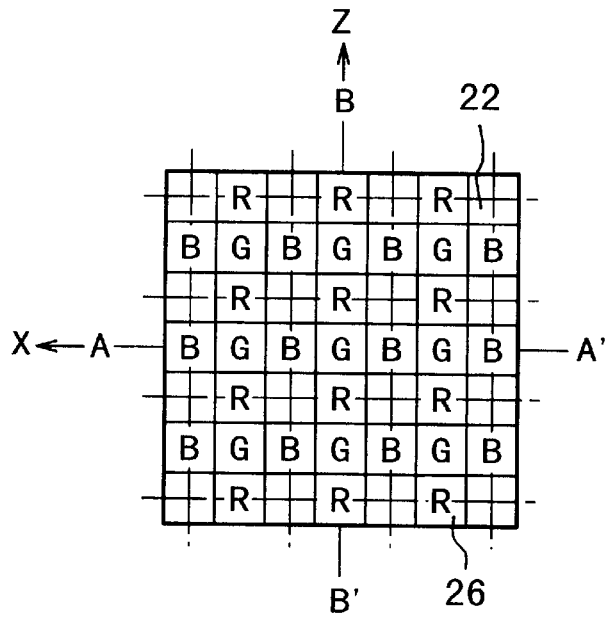
FIGS. 12A–12C are a plan view and sectional views for illustrating principles of color separation and color synthesis according to a liquid crystal panel of the present invention.
Figure 12B:
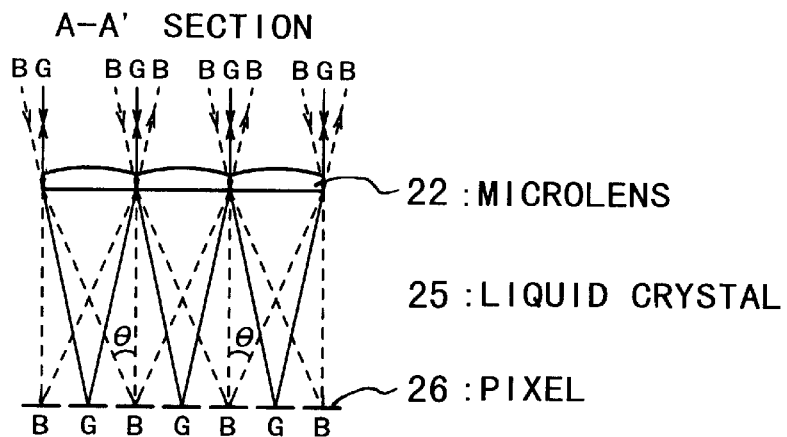
Figure 12C:
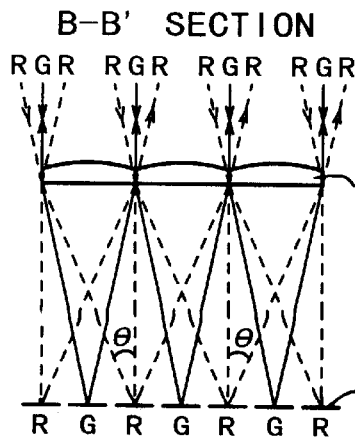

The principle of color separation and color synthesis according to this embodiment is explained with reference to FIGS. 12A–12C. FIG. 12A is a schematic top plan view of the liquid crystal panel 2, and FIGS. 12B and 12C are schematic sectional views of this panel 2 taken along line A–A' (x-direction) and line B–B' (y-direction), respectively, in FIG. 12A. Among these, FIG. 12C shows a section along the y-z plane, corresponding to FIG. 10, and illustrates the manners of incidence and emission of the G-light and R-light through respective microlenses 22.

As is understood from FIG. 12C, each G-pixel electrode 26 is disposed right below the center of an associated microlens 22, and each R-pixel electrode 26 is disposed right below a boundary between associated neighboring microlenses 22. Accordingly, it is preferred that the incident angle θ of R-light is set to provide a value of tan θ that is equal to a ratio between a pixel pitch (between G- and R-pixels) (of e.g., 20 μm) and a distance between a microlens and a pixel electrode (of e.g., 100 μm).

On the other hand, FIG. 12B shows an x-y section of the liquid crystal panel 2. Along the x-y section, B-pixel electrodes and G-pixel electrodes are alternately disposed similarly as in FIG. 12C. Thus, each G-pixel electrode is disposed right below the center of an associated microlens, and each B-pixel electrode is disposed right below a boundary between associated neighboring microlenses.

Incidentally, B-light illuminating the liquid crystal panel is incident to the liquid crystal panel in an oblique direction along the x-y plane after polarization through the PBS 3, so that B-light incident through a microlens is reflected by a B-pixel electrode and emitted through a microlens neighboring the microlens for the incidence in the x-direction, as shown in FIG. 12B and in quite the same manner as R-light. The B-light entering the B-pixel electrode is modulated by the liquid crystal adjacent to the B-pixel electrode and projected after being emitted out of the liquid crystal panel in the same manner as G-light and R-light described above.

Furthers it is also preferred that each B25 pixel electrode is disposed right below a boundary between associated neighboring microlenses, and R-light is incident to the liquid crystal panel at an angle θ giving a tan G that is equal to a ratio between a pixel pitch (between G- and B-pixels) (of, e.g., 20 μm) and a distance between the microlens and the pixel electrode (of, e.g., 100 μm).

In the liquid crystal panel according to this embodiment, the (color) pixels of R, G and B are arranged in the order of RGRGRG . . . in the z-direction and in the order of BGBGBG . . . in the x-direction (as shown in FIG. 12A). Thus, each pixel has a vertical size and a lateral size which are respectively a half of those of a microlens, and the pixel pitches are respectively a half of the microlenses in both x- and z-directions. Further, each pixel is disposed right below the center of an associated microlens two-dimensionally. Further, each R-pixel is disposed between G-pixels in the z-direction and at a boundary between adjacent microlenses, and each B-pixel is disposed between G-pixels in the x-direction and at a boundary between adjacent microlenses. Further, each microlens has a nearly rectangular shape having a size of two times as large as that of a pixel in both longitudinally and laterally.

Figure 13:
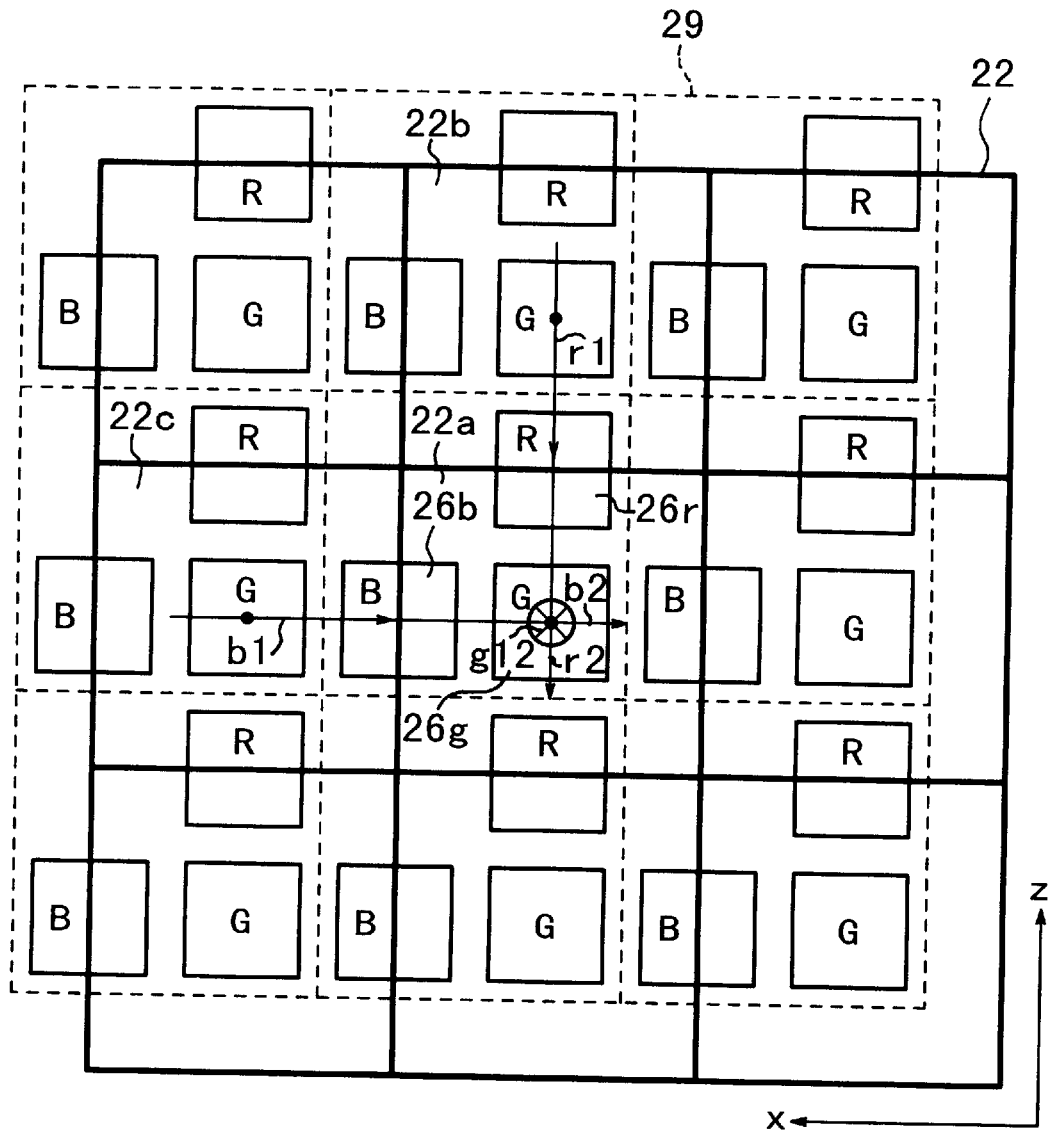
FIG. 13 is an enlarged partial view of a liquid crystal panel according to the third embodiment of the invention.

FIG. 13 is a partial enlarged plan view of the liquid crystal panel. Referring to FIG. 13, a square area defined by a dashed line frame 29 represents a pixel unit including a set of R, G and B pixels, which are driven by a matrix drive circuit (27 in FIG. 10) based on R, G and B picture signals for a single pixel position.

Now, one pixel unit including an R-pixel electrode 26r, a G-pixel electrode 26g and a B-pixel electrode 26b is noted. The R-pixel electrode 26r is illuminated with R-light obliquely incident thereto through a microlens 22b as indicated by an arrow r1, and the resultant R-reflected light is emitted through a microlens 22a as indicated by an arrow r2. The B-pixel electrode 26b is illuminated with B-light obliquely incident thereto trough a microlens 22c as indicated by an arrow b1, and the resultant B-reflected light is emitted through a microlens 22a as indicated by an arrow b2. Further, the G-pixel electrode 26g is illuminated with vertically G-light vertically incident thereto through a microlens 22a as indicated by an arrow g12 directed from the front side to the reverse side of the drawing, and the resultant G-reflected light is emitted through the same microlens 22a vertically in a direction from the reverse side to the front side of the drawing.

Thus, in this embodiment of the liquid crystal panel according to the present invention, the R, G and B pixels constituting one pixel unit are illuminated with light fluxes incident thereto through different microlenses but the reflected light fluxes are emitted through an identical microlens (22a in this case). This also holds true with the other pixel units each including R, G and B pixels.

Figure 14:
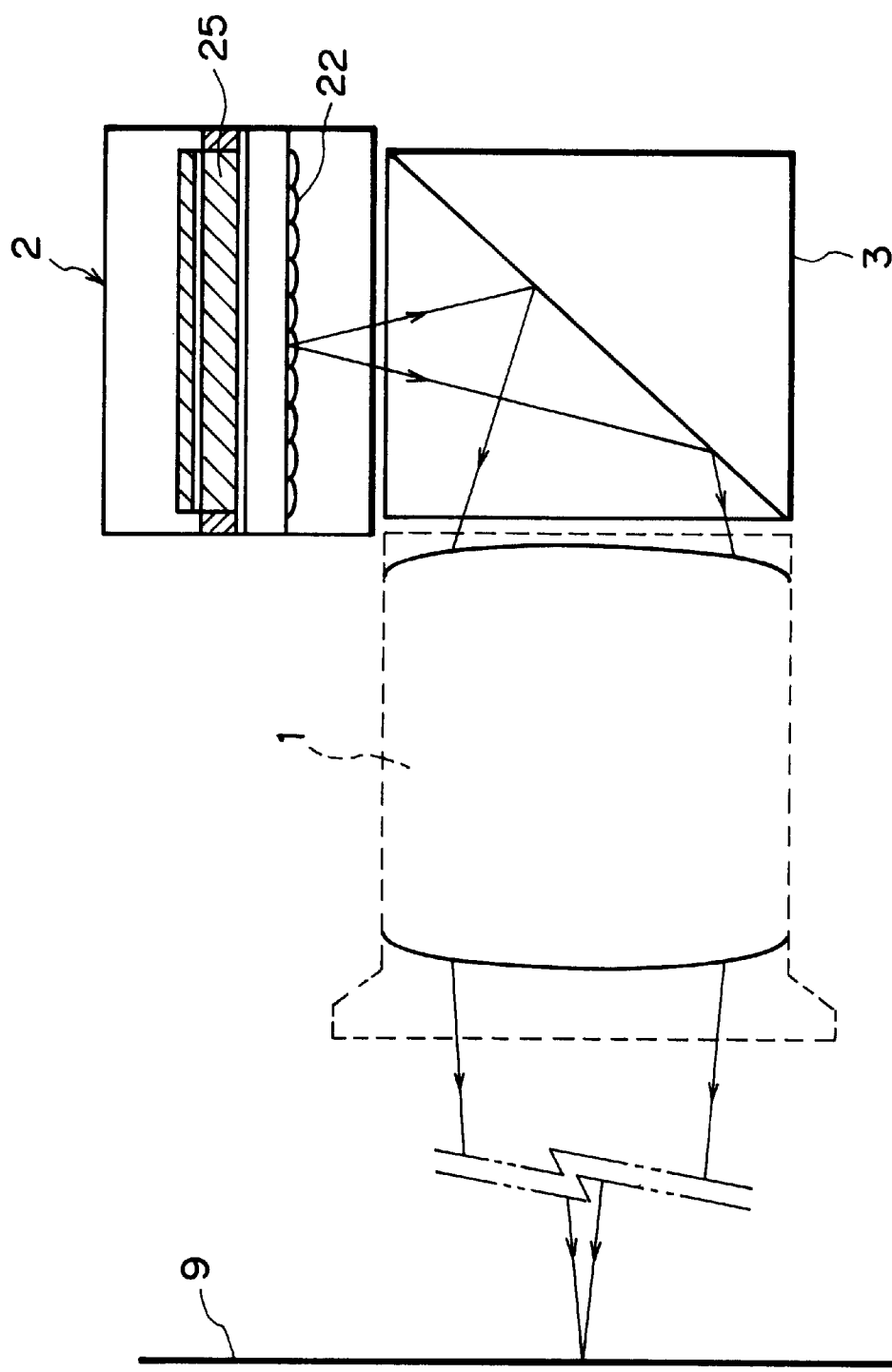
FIG. 14 illustrates a partial organization of a projection-type liquid crystal display apparatus including the liquid crystal panel according to the third embodiment.
Figure 15:
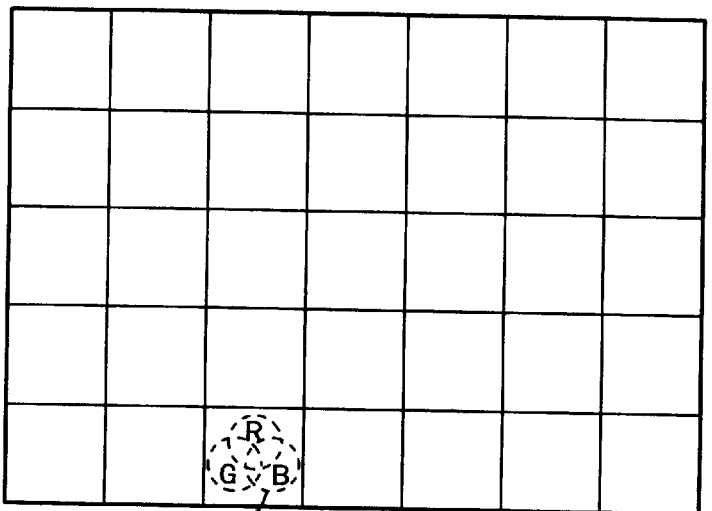
FIG. 15 illustrates a partial enlarged view of the resultant projected picture on a screen.

Accordingly, in case where all the emitted light fluxes from a liquid crystal panel 2 are passed through a PBS 3 and a projection lens 1 to be projected onto a screen 9 as shown in FIG. 14, if an optical adjustment is effected so that the respective microlens positions on the liquid crystal panel 2 are projected onto the screen 9, the projected picture is composed of an assembly of frames corresponding to the microlenses as shown in FIG. 15, each frame comprising a mixture color of emitted light fluxes from R, G and B pixels of a corresponding pixel unit. Thus, different from a projected picture retaining an R, G and B-mosaic pattern as shown in FIG. 26 obtained by a conventional system, a high-quality color picture display free from maintenance of such a minute primary color mosaic pattern can be realized.

Figure 16:
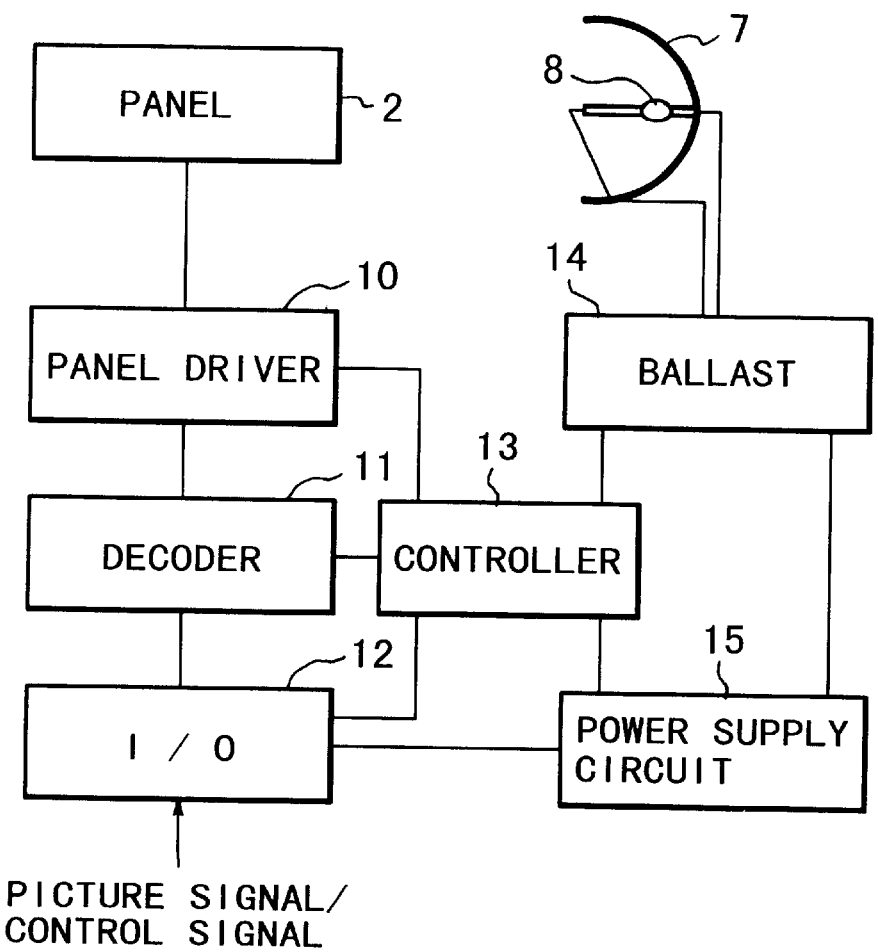
FIG. 16 is a block diagram of a drive circuit system for a projection-type liquid crystal display apparatus according to the invention.

Now, the organization of each picture element and the active matrix drive circuit unit 27 formed on the silicon semiconductor substrate 28 used for active drive of the picture elements is described in further detail. FIG. 16 is a block diagram of a drive circuit for a projection-type liquid crystal display apparatus including a liquid crystal display according to the invention. Referring to FIG. 16, the drive circuit includes a panel driver 10 for forming liquid crystal drive signals by subjecting R, G and B picture signals to polarity inversion, and prescribed voltage amplification, and forming signal for driving the counter electrode 24 and various time signals. n interface 12 is included to decode various picture signals and controlled transmission signals into standard picture signals.

A decoder 11 is included to decode the standard picture signals from the interface 12 into R, G and B primary color picture signals and synchronizing signals. A ballast 14 is used to stably drive an arc lamp 8 equipped with a reflector 7 and is connected to a power supply circuit 15 for supplying a power to respective circuits. These units are connected to a controller 7 including an operation unit (not shown) installed therein and effecting overall control of the respective circuit blocks.

Thus, the projection-type liquid crystal display apparatus of this embodiment only requires such a very common single device-type projector and still can effect an R, G and B mosaic-free high quality color picture display as described above without requiring a special drive circuit.

Figure 17:
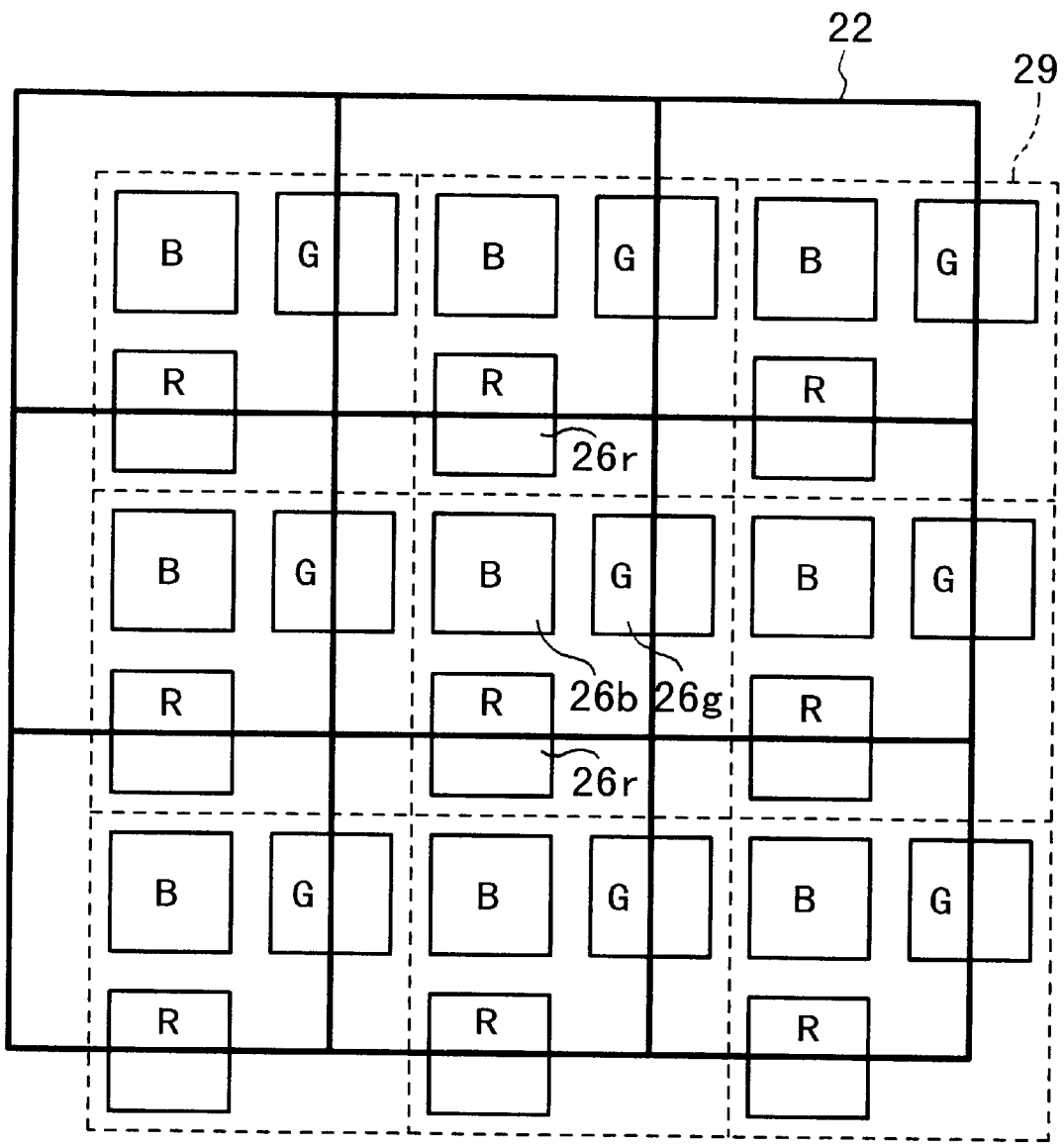
FIG. 17 is a partial enlarged plan view of a liquid crystal panel according to another embodiment of the invention.

According to another embodiment, the liquid crystal panel (liquid crystal device) of the present invention can also assume a color pixel arrangement as shown in FIG. 17 wherein each B-pixel is placed right below the center of a microlens (with a possibility of optical axis deviation for obviating the interference with disclination at pixels as in the previous embodiments), G-pixels are arranged laterally and alternately with the B-pixels, and R-pixels are arranged longitudinally and alternately with the B-pixels. In this arrangement, B-light is incident vertically, and R- and G-lights are incident obliquely at an identical direction in different directions, so that the reflected right fluxes from the R-, G- and B-pixels are emitted through a common microlens 22, whereby identical effects as in the above embodiment can be attained. It is of course possible to adopt an arrangement wherein each R-pixel is disposed directly below the center of a microlens 22, and the other color pixels are arranged alternately with the R-pixels laterally or vertically.

(Fourth Embodiment)

Figure 18:
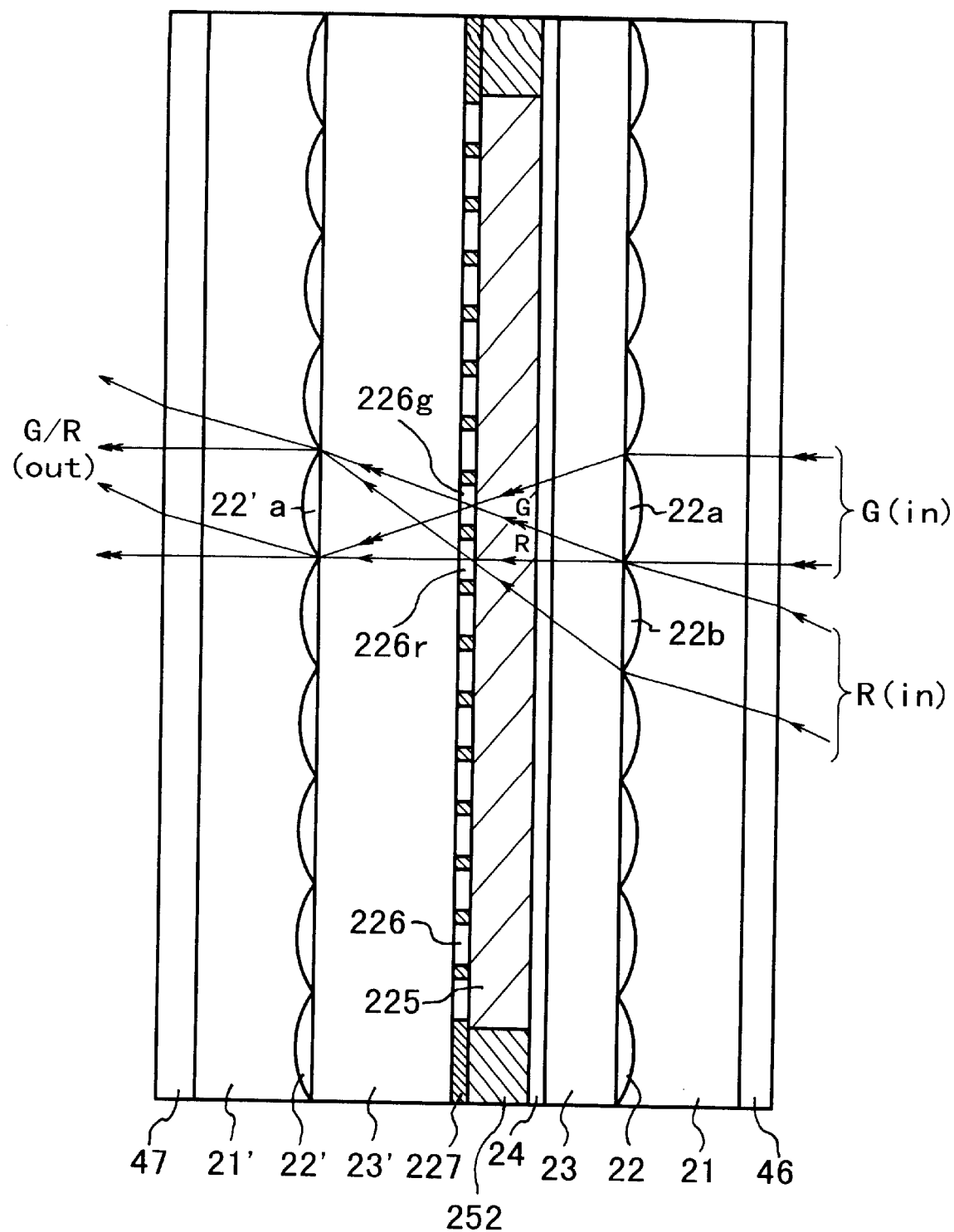
FIG. 18 is a schematic sectional view of the panel of FIG. 17.

FIG. 18 is an enlarged schematic sectional view (corresponding to FIG. 10 shown in Y-Z section in the previous embodiment) of a liquid crystal panel (liquid crystal device) according to a fourth embodiment of the present invention. Referring to FIG. 18, the liquid crystal panel includes microlens substrates 21 and 21', microlenses 22 and 22', sheet glasses 23 and 237 for adjusting a distance between the microlenses and the pixels, a transparent counter electrode 24, a liquid crystal layer 225 of DAP (deformation of vertically aligned phase) mode, transparent pixel electrodes 226, an active matrix drive circuit unit 27, and a pair of cross nicol polarizers 46 and 47.

The microlenses 22 and 22' are formed on one surface each of glass substrates 21 an 21' of alkaline glass by the so-called ion exchange process so as to form a pair of two-dimensional arrays at a pitch twice as large as that of the pixel electrodes 226. These microlens sheets 21 and 21' are applied to sheet glasses 23 and 23'. The liquid crystal layer 225 comprises a nematic liquid crystal of the DAP mode and disposed in a prescribed homeotropic alignment state by alignment layers (not shown, formed over the electrodes 226 and over the transparent counter electrode 24). The pixel electrodes 226 comprise ITO and are formed on the sheet glass 23.

The active matrix drive circuit unit 227 is a TFT circuit based on an amorphous silicon or polysilicon film and supplies drive voltages to the pixel electrodes 226 according to the active matrix drive mode. The active matrix drive circuit unit 227 is formed on the sheet glass 231 and has a planar arrangement pattern as shown in FIG. 19.

Figure 19:
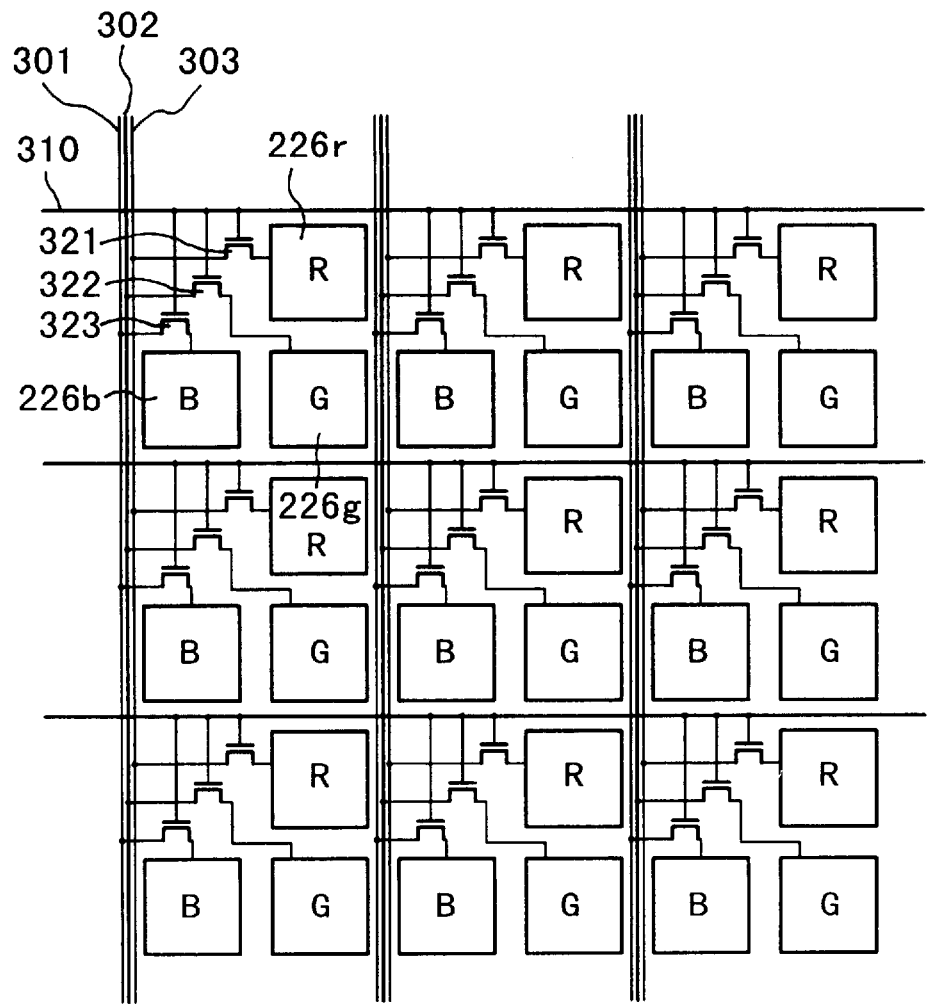
FIG. 19 is a partial circuit diagram of an active matrix drive unit of a liquid crystal panel according to the invention.

Referring to FIG. 19, the drive circuit unit 227 includes B-picture signal lines 301, G-picture signal lines 302, R-picture signal lines 303, gate lines 310, TFTs 321, 322, 323, . . . , and transparent pixel electrodes 226r, 226g and 226b of R, G and B, respectively. At an peripheral part surrounding the circuit matrix region (i.e., a display region), gate line drivers (not shown) such as a vertical shift register and data line drives such as a horizontal shift resistor are disposed.

The peripheral drive circuit and active-matrix drive circuit are designed so as to write in prescribed display states at respective color pixels R, G and B based on given primary color signals of R, G and B. Each pixel electrode 226 is not provided with a color filter segment but can be discriminated as one of R, G and B pixels based on a primary color signal supplied thereto, thereby forming a prescribed arrangement of R, G and B pixels.

Now, G-light for illuminating the liquid crystal panel is noted. In this embodiment, the G-light is vertically incident to the liquid crystal panel. Among the G-color rays, a G-color ray incident to one microlens 22a is represented by arrows G(in) in FIG. 18. As shown in FIG. 18, G-light is condensed by the microlens 22a to illuminate a G-pixel electrode 226g after passing through the liquid crystal layer 225 and then passed through a microlens 22'a on the other TFT side substrate to be emitted out of the liquid crystal panel. While passing through the liquid crystal layer 225 in this way, the polarized G-light is optically modulated by the liquid crystal 225 driven under an electric field formed between the pixel electrode 226g supplied with a data voltage and the counter electrode 24, and then emitted out of the liquid crystal panel. Depending on the degree of modulation received at this stage, the quantity of the G-light allowed to pass through the polarizer 47 and directed toward the projection lens 1 is changed, thereby exhibiting a density gradation at the pixel 226g.

Then, R-light incident to the liquid crystal panel in an oblique direction in the indicated section (y-z plane) is noted in FIG. 18. For example, an R-light ray denoted by arrows R(in) incident to the panel is first polarized through the polarizer 46 and then condensed by a microlens 22b to illuminate an R-pixel electrode 226r which is shifted upward than an exact left position from the microlens 22b and, after passing through the R-pixel electrode 226r, emitted also through the microlens 226'a out of the panel as a light flux denoted by G/R(out). During the passage through the liquid crystal layer 225, the polarized R-light is also modulated at a degree depending on an electric field formed between the R-pixel electrode 226r supplied with a data voltage and the counter electrode 24 and applied to the liquid crystal 225 thereat. The thus modulated R-light emitted out of the liquid crystal panel is projected as a portion of picture light in the same manner as the G-light.

FIG. 18 appears to illustrate a state where the G-light and the R-light adjacent to the G-pixel electrode 226g and the R-pixel electrode 226r appear to overlap each other, thus interfering with each other. This is however simply because the thickness of the liquid crystal layer 225 is schematically enlarged for easy understanding. The actual thickness of the liquid crystal layer 225 is on the order of 5 μm which is much smaller than 50–100 μm of the sheet glasses 23 and 23', SO that such interference does not actually occur regardless of the pixel size.

What is claimed is:

1. A liquid crystal device, comprising a matrix electrode substrate having thereon a plurality of pixel electrodes arranged in a matrix, a counter substrate having thereon a counter electrode disposed opposite to the pixel electrodes, a liquid crystal disposed between the pixel electrodes and the counter electrode so as to form a pixel corresponding to each pixel electrode and having a center, and an array of microlenses each disposed to have an optical axis for forming a condensed light spot for illuminating the liquid crystal at each pixel, wherein each pixel is accompanied with a disclination of the liquid crystal along at least one side thereof, and each microlens is disposed to have an optical axis shifted from the center of an associated pixel so as to form a condensed light spot substantially free from overlapping with the disclination at the pixel.

2. A liquid crystal device according to claim 1, wherein each pixel is substantially rectangular in planar shape and is accompanied with the disclination of the liquid crystal along at least one side thereof.

3. A liquid crystal device according to claim 1, wherein each microlens is disposed to have a center at a planar position shifted from the center of the associated pixel.

4. A liquid crystal device according to claim 1, wherein each microlens is disposed to have a center at a planar position in alignment with the center of the associated pixel but receives a light flux obliquely incident thereto to have an optical axis shifted from the center of the associated pixel.

5. A liquid crystal device according to claim 1, wherein the pixel electrodes are reflective electrodes so as to provide a reflection-type liquid crystal device.

6. A liquid crystal device according to claim 1, wherein the pixel electrodes are transparent electrodes so as to provide a transmission-type liquid crystal device.

7. A liquid crystal display apparatus, comprising:

a liquid crystal device according to any one of claims 1–6, and an optical system for emitting light fluxes to be passed through the microlenses to illuminate the pixels.

* * * * *

UNITED STATES PATENT AND TRADEMARK OFFICE
CERTIFICATE OF CORRECTION

PATENT NO. : 6,078,371
DATED : June 20, 2000
INVENTOR(S) : TAKESHI ICHIKAWA ET AL Page 1 of 2

It is certified that error appears in the above-identified patent and that said Letters Patent is hereby corrected as shown below:

ON THE TITLE PAGE:

[57] ABSTRACT,

Line 17, "until" should read --unit--.

IN THE DRAWINGS:

Sheet 2 of 19, FIG. 3, "COMPPUTER" (both occurrences) should read --COMPUTER--.

COLUMN 1:

Line 9, "a" should read --the--; and
            "nowadays," should read --today,--.

COLUMN 4:

Line 54, "capable. of" should read --capable of--.

COLUMN 6:

Line 5, "characteristic" should read --characteristics--.

COLUMN 9:

Line 66, "of" should read --to--.

UNITED STATES PATENT AND TRADEMARK OFFICE
CERTIFICATE OF CORRECTION

PATENT NO. : 6,078,371
DATED : June 20, 2000
INVENTOR(S) : TAKESHI ICHIKAWA ET AL It is certified that error appears in the above-identified patent and that said Letters Patent is hereby corrected as shown below:

<u>COLUMN 16</u>:

Line 30, "B25 pixel" should read --B-pixel--;
Line 33, "tan G" should read --tan ϴ--; and
Line 66, "trough" should read --through--.

<u>COLUMN 18</u>:

Line 17, "237" should read --23'--;
Line 39, "231" should read --23'--; and
Line 45, "an" should read --a--.

<u>COLUMN 19</u>:

Line 35, "SO" should read --so--.

Signed and Sealed this

Twenty-fourth Day of April, 2001

*Attest:*

NICHOLAS P. GODICI

*Attesting Officer*  *Acting Director of the United States Patent and Trademark Office*